(12) United States Patent
Melnar et al.

(10) Patent No.: US 7,319,958 B2
(45) Date of Patent: Jan. 15, 2008

(54) POLYPHONE NETWORK METHOD AND APPARATUS

(75) Inventors: Lynette Melnar, Austin, TX (US); Jim Talley, Austin, TX (US); Yuan-Jun Wei, Hoffman Estates, IL (US); Chen Liu, Lisle, IL (US)

(73) Assignee: Motorola, Inc., Schaumburg, IL (US)

( * ) Notice: Subject to any disclaimer, the term of this patent is extended or adjusted under 35 U.S.C. 154(b) by 755 days.

(21) Appl. No.: 10/365,820

(22) Filed: Feb. 13, 2003

(65) Prior Publication Data

US 2004/0176078 A1 Sep. 9, 2004

(51) Int. Cl.
*G10L 15/04* (2006.01)

(52) U.S. Cl. .................................... 704/254

(58) Field of Classification Search ............. 704/251, 704/254, 277
See application file for complete search history.

(56) References Cited

U.S. PATENT DOCUMENTS 6,085,160 A * 7/2000 D'hoore et al. .......... 704/256.2
6,912,499 B1 * 6/2005 Sabourin et al. ............ 704/243

OTHER PUBLICATIONS

Cheng, Y.M., Chen Liu, Yuan-Jun Wei, Lynette Melnar, Changxue Ma. 2003. "*An Approach to Multilingual Acoustic Modeling for Portable Devices*", Eurospeech, Geneva (pp. 3121-3124).
Chomsky, N., and Halle, M. 1968. "*The Sound Pattern of English*", Harper & Row, Publishers New York, Evanston, and London, 4-6, (pp. 298-329).
Crothers, John. 1978. "*Typology and Universals of Vowel Systems*", Universals of Human Language, vol. 2, Phonology. Joseph H. Greenburg, Charles A. Ferguson, Edith A. Moravesik, editors, Stanford: Stanford University Press (pp. 93-152).
Fikkert, Paula. 1995. "*Acquisition of Phonology*", Glot International, 1:8, 3-8 (25 pages).
Gamkrelidz, Thomas V. 1978. "*Stops and Fricatives*", Universals of Human Language, Vol. 2, Phonology. Joseph H. Greenburg, Charles A. Ferguson, Edith A. Moraveski, editors, Stanford: Stanford University Press (pp. 9-46).
Hieronymus, J. L. 1994. "*ASCII Phonetic Symbols for the World's Languages: Worldbet*", Technical Report, AT&T Bell Labs (48 pages).
Hieronymus, J. L. 1997. "*Worldbet Phonetic Symbols for Multilanguage Speech Recognition and Synthesis*", Technical Report, AT&T Bell Labs (32 pages).
Hockett, Charles F. 1966. "*The Problem of Universals in Language*", Universals of Language, 2ed. Cambridge, MA: MIT Press (pp. 1-29).

(Continued)

*Primary Examiner*—Abul K. Azad

(57) ABSTRACT

Acoustic phones (preferably drawn 12 from a plurality of spoken languages) are provided 11. A hierarchically-organized polyphone network (20) organizes views of these phones of varying resolution and phone categorization as a function, at least in part, of phonetic similarity (14) and at least one language-independent phonological factor (15). In a preferred approach, a unique transcription system serves to represent the phones using only standard, printable ASCII characters, none of which comprises a special character (such as those characters that have a command significance for common script interpreters such as the UNIX command line).

25 Claims, 1 Drawing Sheet

OTHER PUBLICATIONS

IPA. 1999. *"Handbook of the International Phonetic Association"*, Cambridge: Cambridge University Press, 27-38.

Jakobson, R. 1941/68. *Child Language, Aphasia and Phonological Universals*. The Hague & Paris: Mouton, 68-81, 87-91.

Kaiser, Ed. 1997. *"IPA, Worldbet, and OGIbet"*, Course Manual : Spoken Language Systems Laboratory, Center for Spoken Language Understanding, Department of Computer Science & Engineering, Oregon Graduate Institute of Science & Technology (1 page).

Maddieson, I. 1984. *"Patterns of Sounds"*, Cambridge Studies in Speech Science and Communication, Cambridge: Cambridge University Press, 5-24.

Melnar, Lynette and Jim Talley. 2003. *"Phone Merger Specification for Multilingual ASR: The Motorola Polyphone Network"*, ICPhS, Barcelona ( pp. 1337-1340).

Ophala, John and Carrie Lang. 1996. *"Temporal Cues for Vowels and Universals of Vowel Inventories"*, ICSLP, Philadelphia (4 pages).

Rodman, M., B. Petek, T. Brøndsted. 2002. *"SPE-Based Selection of Context-Dependent Units for Speech Recognition"*, LREC 2002 WS on Portability Issues in Human Language Technologies, (pp. 78-84).

Stuker, S., F. Metze, T. Schultz, A. Waibel. 2003. *"Integrating Multilingual Articulatory Features into Speech Recognition"*, Eurospeech, Geneva (pp. 1033-1036).

Schultz, T., A. Waibel. 2000. *"Polyphone Decision Tree Specialization for Language Adaptation"*. ICASSP, Istanbul (4 pages).

Wells, John. 1995. *"Computer-coding the IPA: a proposed extension of SAMPA"*, London: Phonetics and Linguistics Dept., UCL (18 pages).

\* cited by examiner

US 7,319,958 B2

POLYPHONE NETWORK METHOD AND APPARATUS

TECHNICAL FIELD

This invention relates generally to acoustic phones and more particularly to networks of multiple phones.

BACKGROUND

Speech recognition techniques are known in the art. Many such techniques utilize models that are selected as a function of a polyphone network. For example, a network of phones (wherein a "phone" is generally understood to typically comprise a speech sound considered as a physical event without regard to its possible phonological status in the sound system of a language) that comprise at least the primary phonemes (wherein a "phoneme" is generally understood to comprise an abstract unit of the phonological system of a language that corresponds to a set of similar speech sounds that are perceived to be a single distinctive sound in the language) of a given spoken language (or specific dialect thereof can comprise an acoustic foundation upon which one derives a set of models that a corresponding speech recognition engine can utilize to effect recognition of a sample of uttered speech.

Speech recognition platforms (such as, for example, a cellular telephone) that support recognition of multiple languages are also known. Unfortunately, current multilingual (and/or multi-dialect) automatic speech recognition technologies face a number of practical constraints that appear to significantly limit widespread commercial application of such an approach. One problem involves the cost of acquiring and/or the relative availability of relevant language resources and expertise. For example, while many hundreds of different acoustic phones are known to be utilized globally in one language or another, any given language (or dialect) tends to use as phonemes only a relatively small subset of this larger pool. The limited availability of resources and technology-savvy expert knowledge required to linguistically characterize a language for speech recognition engineering purposes (including, but not limited to, specifically identifying those phonemes that appropriately characterize a given language) are an impediment to broad language coverage. Further, the time and expense of creating, finding, or otherwise acquiring appropriate acoustic speech data (with associated transcriptions, lexica, and so forth) of acceptable quality and quantity to permit training of speech models often make such endeavors commercially unfeasible, especially for consumer populations that represent a relatively small speaker group and/or an emerging market.

Computational resource limitations present another problem. A not atypical prior art approach combines a plurality of monolingual speech recognition systems to consolidate sufficient capability to support multiple languages and/or dialects. With such an approach, however, requirements for both the necessary language resources and computational resources increase substantially proportionally with each incremental supported language and/or dialect. The costs and/or form factor constraints associated with such needs can again influence designers away from including languages that correspond to smaller speaker populations and/or smaller present marketing opportunities.

To attempt to meet such problems, some effort has been made to consider sharing acoustic models across a plurality of languages and/or dialects. Such an approach typically requires alteration to the fundamental approach by which models are developed (for example, while models that result from the approaches noted earlier tend to preserve substantially all defined phonetic contrasts in a given set of targeted languages or dialects, such models also poorly support any attempt to exploit any cross-language allophonetic coincidences that might also exist; in addition, the set of models is often too large and too finely differentiated for cost-effective and efficient multilingual or multi-dialect automatic speech recognition needs). For example, one approach employs an acoustic feature-based data-driven method to achieve a kind of phone merger. Acoustic models from a collection of monolingual speech recognition systems are compared and acoustically similar models are merged. Such an approach indeed tends to at least reduce to some extent total memory requirements, but such an approach is also relatively indiscriminate with respect to the grouping of acoustically similar phones (for example, this approach tends to readily permit the merger of acoustically similar but phonologically contrastive models). This approach also fails in large measure to supply acoustic models of phones for which little or no data is conveniently available. One suggested alteration to this latter approach has been to constrain the acoustic data-driven method as a function of language knowledge. This approach seeks to retain improved memory requirements while also attempting to address acoustic confusability of distinct phones. Unfortunately, however, this attempt at improvement still remains largely dependent upon the availability and quality of language data.

Another impediment to fielding a commercially useful result is the present practice of tending to represent phone information with a transcription system that favors unique font sets and/or unusual characters that are typically non-alphanumeric, printable characters that are commonly used for special purposes in command line scripting as they have special control interpretations (such as, for example, '@', '>', '\', '|', '=', '{', '`', '?', '*', '(', and so forth) in one or more relevant computer command and control protocols. For example, some characters used by some transcription systems present phone information that is also interpreted by Unix command line interpreters as specific Unix commands. This unfortunate proclivity further complicates the matter of attempting to provide a flexible, efficient polylingual speech recognition method and apparatus.

BRIEF DESCRIPTION OF THE DRAWINGS

The above needs are at least partially met through provision of the polyphone network method and apparatus described in the following detailed description, particularly when studied in conjunction with the drawings, wherein.

Figure 1:
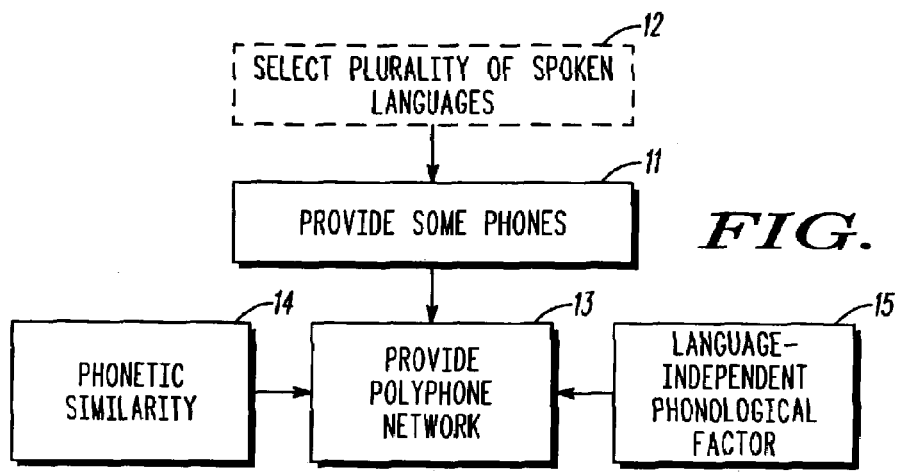
FIG. 1 comprises a flow diagram as configured in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, phonological similarities across a plurality of languages (and/or dialects) are leveraged in a way that is at least partially based upon language-independent factors. More particularly, a plurality of phones that correspond to a plurality of spoken languages can serve to provide a polyphone network as a function, at least in part, of at least one of phonetic similarity as may exist between the phones and at least one language-independent phonological factor. In a preferred embodiment, the plurality of phones correspond to a plurality of languages including at least some languages that are substantially typologically diverse with respect to one another. Such diversity enriches the resultant polyphone network and tends to render such a network more likely to provide satisfactory models even for languages that are not otherwise specifically represented. Pursuant to another preferred approach, at least some of the plurality of phones are based, at least in part, upon at least some phonemes that are themselves substantially unique to only a few (or one) of the represented languages (in one embodiment, all phonemes that are unique to a particular language amongst the plurality of languages are so represented).

In a preferred embodiment, the polyphone network comprises a hierarchical phone correspondence network that preferably organizes merged phone selections in a tree. In one embodiment, the tree can comprise at least one binary branching tree. Depending upon the embodiment, phone information as contained by the polyphone network can be viewed at varying levels of resolution (such that, for example, higher resolution information may include at least some phone information that comprises phonemes for at least some of the plurality of spoken languages and lower resolution information may include phone information that is representative, at least in part, of cross-linguistic and language-independent mutual phonetic similarity and non-contrastiveness of corresponding higher resolution phone information views).

Depending upon the embodiment, the language-independent phonological factor can comprise information such as language-independent phonological contrast, cross-linguistic phone frequency, predetermined linguistic tendencies, and predetermined linguistic universals.

In general, the resultant polyphone network is preferably substantially unbiased towards any particular language, language family, and/or language type.

In a preferred embodiment, the phones are represented in the polyphonic network using a transcription system that comprises only standard ASCII characters (none of which comprises a control character or other special character (hereinafter referred to generally as "special characters") having a corresponding computer operation command meaning nor to which Unix command line interpreters ascribe special significance) such that the transcription system characters only require a standard font set and substantially avoid programming or scripting collisions.

So configured, a polyphonic network can be provided that will tend to well support polylingual purposes, including at least substantial accommodation of languages that are not specifically represented by the network. The resultant network (and speech recognition models based thereon) can also be well accommodated by relatively modest computational resources including reduced memory needs as compared to prior art counterparts.

Referring now to the drawings, and in particular to FIG. 1, in a preferred approach, the process begins with provision 11 of a plurality of phones. In some cases, these phones may be at least partially provided through use of one or more previously compiled/selected phones as drawn from a plurality of spoken languages. If desired, of course, one may optionally first begin by selecting 12 a plurality of specifically selected spoken languages. If desired, the selected languages can constitute a significant portion of all currently known and spoken languages (such as, for example, at least five or even twenty-five percent of all such candidate languages). Regardless, however, it is preferred that the provided phones be drawn from a plurality of languages wherein at least two, and preferably more, of the languages are substantially typologically diverse with respect to one another (in general, significant diversity as between utilized languages will tend to better facilitate the provision of a rich and enabling polyphone network than mere quantity of typologically similar languages). Also in a preferred approach, when providing 11 the phones, at least some of the phones should correspond to phonemes that are themselves substantially unique to each of at least some of the plurality of spoken languages (and where preferably all such unique phonemes are so represented by such phones). Again, capturing such instances of uniqueness will tend in the aggregate to enrich the acoustic qualities of the resultant polyphone network.

Various transcription systems exist by which to express such phones. It is therefore possible to provide 11 the phones as described above using any of a wide variety of known or hereafter developed transcription systems. As noted earlier, however, most existing transcription systems tend to require either unique fonts and/or include characters that have additional instructional meaning for many processing platforms. In a preferred approach, therefore, the phones are represented using a transcription system that comprises only standard, printable ASCII characters and wherein none of the characters utilized comprise a special character having a corresponding computer operation command meaning with respect to the desired operating environment (for example, when using Unix to implement the relevant platform(s), none of the transcription characters should have a command meaning to a Unix command line interpreters). A description of a new preferred transcription system that accords with these design criteria follows.

This transcription system is an ASCII-encoded speech symbol inventory restricted to lower-case alphabetic characters, numerals, and the non-alphanumeric symbol '_'. Each individual symbol is associated with a specific phonetic feature (or feature constellation) dependent on the type of phone represented (consonant or vowel) and its syntactic position in the phone symbol string. In this embodiment, the basic character length of any consonant or vowel phone representation is two; this obligatory symbol pair is referred to as a phone's base sign. Pursuant to a preferred embodiment, a phone's phonetic features are directly encoded into the label. The first symbol of a base sign unambiguously marks the phone as either a consonant or vowel. All non-tonal diacritic symbols are sorted alphabetically behind the base sign and are framed by the marker '_'. Tonal diacritics are suffixed to the right diacritic marker of vowel phone strings. An example of a simple consonant phone representation, one with only the two obligatory base-sign positions filled, is 'kp', where the first position 'k' is associated with the consonant class of phones and indexes 'velar articulation' and the consonant second position 'p' indexes 'voiceless plosive'. Thus, 'kp' is a voiceless velar plosive (/k/ in the International Phonetic Alphabet "IPA"). A complex vowel symbol string, that is, a vowel representation that includes diacritics suffixed to the base sign, is exemplified by 'ii_j_4', where vowel first position 'i' indexes 'unrounded front', vowel second position 'i' signifies 'close', vowel third position 'j' is 'palatal offglide', and forth position '4' is 'low tone' (/ǐ/ in the IPA). The consonant and vowel position classes are defined below, along with an inventory of the position class constituents.

A preferred consonant phone string has the following position structure, from left to right:

1st position (obligatory): symbol representing primary place(s) of articulation;

2nd position (obligatory): symbol representing primary manner(s) of articulation and voice (+/−v); and 3rd position: sorted diacritic symbols, framed left and right by the diacritic marker '_'.

The consonant phone symbols and their interpretations are presented by position class in Table 1.

Within a given consonant symbol string, the first and second positions are only occupied by one symbol each. The first position symbol of a consonant phone label comprises a consonant symbol in traditional Romanized orthography (excluding 'y' as noted below). This convention unambiguously marks the label as a consonant phone.

The third position is not limited in length, but the diacritic set will preferably be sorted. Note that all symbols in the consonant inventory are lower-case alphabetic characters and that any particular character may be reused with a different meaning in a different syntactic position in the phone string. Thus, a first position 'p' means 'bilabial' while a second position 'p' means 'voiceless plosive'. The sign 'pp', therefore, represents a voiceless bilabial plosive. Secondary places and manners of articulation are given in the third position diacritic class. As an example, an aspirated voiceless bilabial plosive is 'pp_c_'.

TABLE 1

Consonant Symbol Inventory by Position Class

| 1st Position (POA) | | 2nd Position (MOA, +/−v) | | 3rd Position (diacritics) | |
|---|---|---|---|---|---|
| Bilabial | p | plosive/−v | p | aspirated/breathy | c |
| labio-dental | f | plosive/+v | b | lateralized | d |
| labio-palatal | m | nasal (+v) | n | laryngealized | h |
| labio-velar | b | fricative/−v | s | palatalized | j |
| Dental | d | fricative/+v | z | velarized | k |
| Alveolar | t | lateral fricative/−v | j | long | l |
| alveo-palatal | g | lateral fricative/+v | y | prenasalized | m |
| alveo-lateral | l | approximate (+v) | w | nasal(ized/release) | n |
| Retroflex | r | lateral-approx. (+v) | l | devoiced | o |
| Palatal | j | affricate/−v | f | labialized | p |
| Velar | k | affricate/+v | v | imploded | q |
| Uvular | q | tap/flap (+v) | d | syllabic | s |
| Pharyngeal | x | nasal tap/flap (+v) | m | ejected | t |
| Epiglottal | c | trill (+v) | r | non-sibilant | v |
| Glottal | h | | | pre-aspirated | w |
| | | | | pharyngealized | x |
| | | | | not released | z |

A preferred vowel phone string has the following position structure, from left to right:

1st position (obligatory): symbol representing backness/roundness (back, +/−r);

2nd position (obligatory): symbol representing openness;

3rd position: sorted diacritic symbols, framed left and right by the diacritic marker '_'; and 4th position: number representing tone.

The preferred constituents of the vowel position classes are presented in Table 2.

TABLE 2

Vowel Symbol Inventory by Position Class

| 1st Position (back, +/−r) | | 2nd Position (openness) | | 3rd Position (diacritics) | | 4th Position (tones) | |
|---|---|---|---|---|---|---|---|
| front/−r | i | close | i | primary stress | 1 | extra-high | 1 |
| front/+r | y | close, lax | h | secondary stress | 2 | high | 2 |
| central/−r | e | close-mid | e | tertiary stress | 3 | mid | 3 |
| central/+r | o | mid | x | breathy voiced | c | low | 4 |
| back/−r | a | open-mid | o | central offglide | e | extra-low | 5 |
| back/+r | u | open2-mid | c | laryngealized | h | rising | 32 |
| | | open | a | palatal offglide | j | falling | 34 |
| | | schwar (w/e) | r | velar stricture | k | high-rising | 21 |
| | | | | long | l | high-falling | 24 |
| | | | | labial inglide | m | low-rising | 42 |
| | | | | nasalized | n | low-falling | 45 |
| | | | | devoiced | o | rising-falling | 424 |
| | | | | retracted/retroflexed | r | | |
| | | | | overshort | s | | |
| | | | | coronal inglide | t | | |
| | | | | labial offglide | w | | |
| | | | | pharyngealized | x | | |
| | | | | palatal inglide | y | | |

A vowel phone label preferably begins with either a traditional vowel symbol from Romanized orthography or the character 'y'. Thus, any label beginning with 'a', 'e', 'i', 'o', 'u', or 'y' unambiguously marks a vowel phone.

Like the consonant position-class inventories, within a given phone symbol string each constituent of the first and second obligatory positions are in a disjunctive relation to other constituents in their same class. Furthermore, each constituent of these positions is a lower-case alphabetic character and any particular character may be reused in a different position where it is associated with a distinct meaning. Thus, an unrounded open back vowel is represented by the string 'aa', where 'a' indexes 'back unrounded' in vowel first position and 'open' in vowel second position. Non-tonal diacritics are sorted and framed by the diacritic marker '_' and all tonal diacritics are represented by numbers and follow the right diacritic marker. So, for example, a long unrounded open-mid front vowel associated with high tone would be symbolized as 'io_l__1'.

So configured, this transcription system is designed to be usable from both a processing and a human-factors perspective. Because the symbol string is structurally defined and delimited, and because its symbol inventory lacks potentially ambiguous signs in a programming environment, these transcription strings are easy to parse and manipulate. Because individual symbols are consistently used within their type (consonant or vowel) and class (position number) and were chosen to be as congruent as possible with symbols from pre-existing phonetic symbol inventories, and because string syntax is well defined, this transcription system is relatively easily learned and expanded (unlike, for example, the IPA system).

As noted above, each symbol string preferably consists of a two character base sign to which diacritic markers may be suffixed. Suffixes only terminate in either the right-frame diacritic marker '_' or a right frame diacritic marker followed by one or more numerals. In this embodiment, the first position character of a base sign always marks the string as either consonant or vowel, i.e., there is no overlap of characters between the first position consonant and vowel symbol inventories. Finally, there is no use of symbols that are employed in a special way in programming. Thus, every symbol-string label indexing a distinct phone can be easily identified and parsed with minimal programming effort, and it is not generally necessary (as it is with many other phonetic alphabets) to build a special-purpose scanner designed to convert these labels to other label types (numbers, for example).

Each individual character used in the above described preferred transcription system comprises a sign, or form-meaning pair. The relationship between a character's graphic form and its phonetic meaning is one-to-many and uniquely dependent on the sign's context, that is, its place in the symbol-string label. For example, the form 'w' is associated with three distinct articulation features or feature constellations: 1) voicing and approximation, 2) pre-aspiration, and 3) labial offgliding. Notwithstanding the above, the meaning of any particular 'w' is never ambiguous: 'w' is associated only with meaning (1) as a second position consonant sign; it indexes meaning (2) as a third position consonant diacritic; and as a third position vowel diacritic, it is uniquely linked to meaning (3).

Most alphabetic characters are strongly associated with phonetic meanings that users literate in Romanized orthographies learned during childhood. Because of this, there is an attempt in most multilingual phonetic inventories to conform as much as possible to pre-existing form-meaning associations, and the above described preferred transcription system mirrors this viewpoint. Thus the symbol 'i' is typically associated with the vowel features 'close', 'front' and 'unrounded' and this proposed transcription system observes this conventional sense as well. Only these features are divided between two classes: vowel position 1 (where 'i' means 'front' and 'unrounded') and vowel position 2 (where it means 'close'). By unpacking a character form's typically associated feature set, it becomes possible to use the form in several distinct signs, each associated with just one or two features of the source sign.

There are presently several pre-existing phonetic alphabets in common use within the speech research community. XSAMPA and Worldbet, for example, are relatively widely employed for multilingual applications (though again, these systems tend to suffer drawbacks associated with computer processing applications and conflicts). Appendix A attached hereto presents an abbreviated base-sign inventory for the preferred transcription system (denoted as "new" in the appendix) described above and further maps those contents to the XSAMPA, Worldbet, and the IPA phonetic alphabets for the convenience of the reader.

With continued reference to FIG. 1, the provided phones 11 are then used to provide 13 a polyphone network as a function, at least in part, of phonetic similarity 14 as may exist between certain of the provided phones and at least one language-independent phonological factor 15 (such as, for example, at least one of language-independent phonological contrast, cross-linguistic phone frequency, predetermined linguistic tendencies, and predetermined linguistic universals). So configured, the resultant polyphone network will tend to be substantially unbiased towards any particular language, language family, and/or language type.

Figure 2:
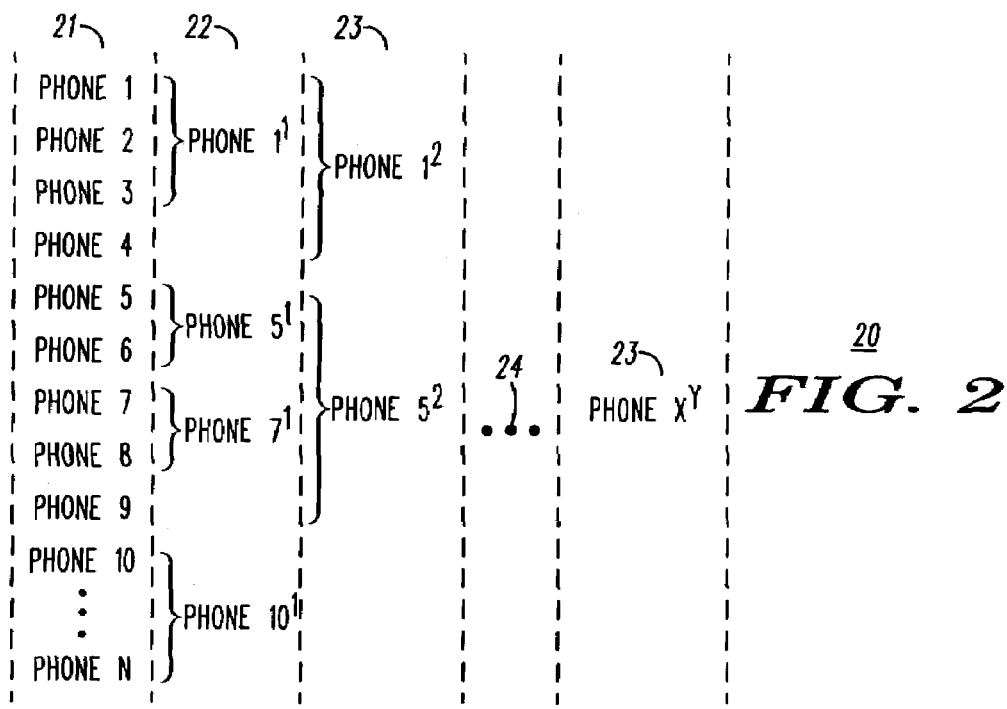
FIG. 2 comprises a schematic representation of a hierarchical phone correspondence network as configured in accordance with an embodiment of the invention.

In a preferred approach, the polyphone network includes and/or comprises a hierarchical phone correspondence network. In one embodiment, that hierarchy can be configured as a plurality of merged phone selections organized in at least one tree (such as, for example, a binary branching tree hierarchical arrangement). For example, and referring now to FIG. 2, all of the phones (such as, for example, PHONE 1 and PHONE 2) that comprise the network can share a common highest resolution view 21 or level within the polyphone network 20. A next level or view 22 up from this highest resolution view 21 in turn comprises phones that represent a merger of two or more lower level phones (to put this another way, this lower resolution view provides a lower resolution view of phone information comprised of phone categories). To illustrate, PHONE 1, PHONE 2, and PHONE 3 from the first highest resolution level 21 have been merged into PHONE $1^1$ at the next level of resolution 22 while PHONE 5 and PHONE 6 have been merged into PHONE $5^1$. In general, the resultant lower resolution phone will comprise a selected one of the merged higher resolution phones. Details regarding merging criteria are provided below. It should also be noted that not all of the higher resolution phones are necessarily merged with another phone at this second level 22 in the hierarchy. Instead, to illustrate, PHONE 4 and PHONE 9 both remain unmerged at this second hierarchical level 22.

In a similar fashion, the resultant phone categories (and remaining unmerged phones of the first hierarchical level 21) are again merged as and how appropriate at a next yet-lower-resolution hierarchical level 23. For example, PHONE $1^1$ and PHONE 4 are merged at this level to yield PHONE $1^2$. In a preferred embodiment, fifteen such levels are provided (with the intervening levels being indicated by the ellipses 24 depicted), with the final lowest resolution view 25 preferably comprising a final category PHONE $X^Y$. Conceptually, this final hierarchical level 25 comprises a single sound that purports to grossly characterize the entire polyphone network, So configured, these various views provide phone categories that correspond to views of varying resolution wherein the phone information essentially represents, at least in part, cross-linguistic and language-independent mutual phonetic similarities and non-contrastiveness of corresponding higher resolution phone information views. As the degree of resolution drops by moving higher in the tree, at least some of the merged phone nodes each comprise a merger of a plurality of phone categories, which phone categories are themselves each most representative of a given plurality of phone categories.

For many tasks, of course, it is not feasible to use a narrow phone transcription as represented at the highest resolution levels of the suggested polyphone network 20. All languages collapse distinct phones that are non-distinct phonologically into phonemes. Using the preferred transcription system detailed above, consider that in English, for example, a flapped alveolar stop (td), a voiceless alveolar stop (tp) and a voiceless aspirated alveolar stop (tp_c_) are all allophones of the phoneme represented by the English alphabetic symbol 't'. Likewise, it is possible for distinct phonemes across languages (though not distinct phonemes internal to a language) to be collapsed into a merged 'superphoneme' classification system. Thus, for example, it is usually the case that a voiceless dental stop phoneme (dp) and a voiceless alveolar stop phoneme (tp) may share acoustic models without losing crucial cross-linguistic phonological distinctions. Such knowledge can be exploited when reducing a multilingual model inventory to a size that is more compatible with recognition systems in embedded devices.

The polyphone network proposed herein comprises a phone merger specification tool for shared multilingual and multi-dialect acoustic modeling that takes advantage of phonetic similarities (as inherently and conveniently defined by the preferred transcription system described above) while maximally preserving known phonological contrasts. In a preferred embodiment, the polyphone network comprises a binary branching tree that has as its leaves a nearly exhaustive inventory of core phones derived from a rich set of typologically diverse languages (where preferably at least all major language families are represented) (and wherein core phone should be understood to refer to an allophone that is most representative of a particular phoneme, defined cross-linguistically). Lower resolution nodes on the tree represent superphonetic categories with merger being preferably based entirely on phonetic similarity, core phone frequency, and language-independent (universal) phonological laws and tendencies.

As an illustration of how language-independent factors can contribute to such a hierarchical arrangement of phone classes, a detailed example is provided below:

Consider the following set of language universals, tendencies, and frequency observations:

Language universal (1): all languages have stop consonants;

Language tendency (1): languages tend to have a plain voiceless stop consonant series;

Frequency observation (1): p, t and k are the most frequently occurring stop consonants in the world's inventories, with t being the most common and p the least common of the three;

Language universal (2): t<k<p; and

Language tendency (2): language phoneme inventories exploit the maxim of sufficient discriminability—that is, contrastive sounds in any given language must be sufficiently distinct from one another to be distinguishable in articulation and perception.

The first language universal points to the relative importance of stops as a consonant class. Other consonant classes (fricatives, liquids, nasals, and so forth) are not universally present in the world's sound inventories. Thus among the consonants, stops are preferably ranked higher than the other classes. This indicates that the stop class is the highest level consonant class in the phone hierarchy. Language tendency (1) provides additional information about stops. in addition to whatever other stop series a language may have—voiced, ejective, implosive, and so forth—it is likely to have a plain voiceless series. This means that within the stop class, the plain voiceless series is ranked highest in relative cross-linguistic importance.

The provided frequency observation records the overall importance of the three plain voiceless stops p, t, and k. These three stops occur more frequently than any other stops in the world's inventories. And within this set, there is a frequency hierarchy, where t is ranked the highest. The second language universal, t<k<p, signifies that if a language has the stop p, it must also have the stops k and t; and if a language has k, it necessarily has t.

Finally, the second language tendency suggests that contrastive sounds in a given language tend to be distributed proportionally among a range of articulators (lips, alveolar ridge, palate, velum, larynx, and so forth) and to not cluster together at the same region. Therefore, for example, no language contrasts palato-alveolar and palatal phonemes within a given manner series, and contrasts among dentals and alveolars within the same manner series are extremely rare. Notice that the three most common plain voiceless stops, p, t, and k observe this maxim; p is a bilabial stop, t is a dental or alveolar stop, and k is a velar stop.

These above factors contribute to the following preferred high-level hierarchical arrangements for stop consonants in the proposed polyphone network (set forth in the notation of the earlier described preferred transcription):

1. tp^14[2]->tp^13[2] kp^11[2]
2. tp^13[2]->tp^12 pp^10[2]

where a caret ('^') indexes a node in the tree and the numbers signify a hierarchical level, beginning with '0' at the leaves. Therefore, tp^14 is the parent node of the children nodes tp^13 and kp^11, and tp^13 has the children nodes tp^12 and pp^10.

At each node in the tree a confidence score between '1' and '10' appears in square brackets, where '10' indicates very high confidence in the merge and '1' indicates very low confidence in the merge. In the above examples all nodes have a confidence score of '2'. These scores are preferably derived from three knowledge sources: 1) relative phonetic similarity (defined automatically by the transcription structure), 2) relative phonological contrastiveness (that is, how often do the phones included in the children nodes contrast phonologically), and 3) frequency (that is, how frequently the phones included in the children nodes occur cross-linguistically).

The above example illustrates how the preferred polyphone network provides a novel, linguistically informed framework within which the phone model inventory size and search space issues inherent to embedded multilingual or multi-dialect automatic speech recognition can be accommodated while minimizing the negative performance impact of the resource restrictions. The complete proposed preferred polyphone network appears in Appendix B attached hereto.

Such a polyphone network is well suited for multi-language phone transcription, and especially for computational applications. Such a network explicitly encodes phonetic features that both make the inventory maximally extensible and contributes to automatic phonetic similarity metrics in the polyphone network. It can be seen that such a polyphone network further comprises a universal phone merger tool that surpasses other strategies for phone merger by taking into account not only phonetic similarity, but also language-independent universals. Using such a polyphone network, it is possible to derive a language-inclusive phone inventory which has a minimal number of distinct units but which maximally preserves both language-internal and cross-language contrasts. Use of such an inventory greatly reduces corresponding speech recognition search efforts.

Figure 3:
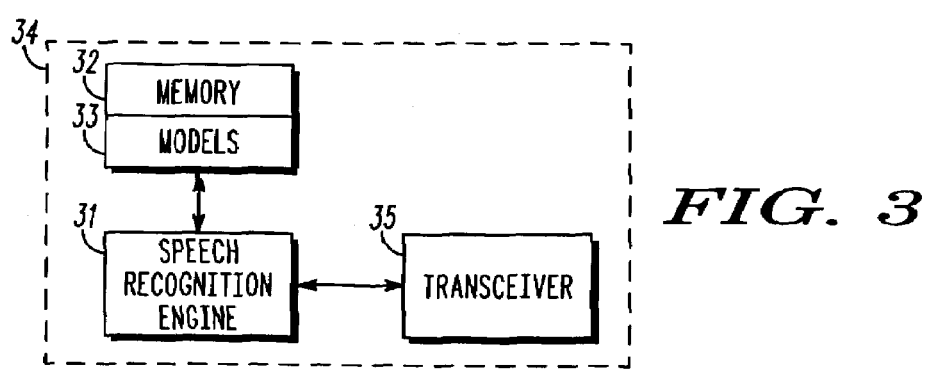
FIG. 3 comprises a block diagram of a speech recognition platform as configured in accordance with an embodiment of the invention.

As illustrated in FIG. 3, a not-uncommon platform such as a two-way wireless communications device 34 (such as, for example, a cellular telephone) often includes a speech recognition engine 31 that interacts one way or another with a wireless transceiver 35 as well understood in the art. Pursuant to these teachings, such a speech recognition engine 31 can now be partially or fully enabled through use of, for example, models 33 that are based, at least in part, upon a polyphone network as described above (such models 33 can of course be stored in off-board memory 32 as illustrated and/or in on-board memory integral to the speech recognition engine 31). So configured, the benefits of speech recognition are more easily realized for a wide variety of languages, including the languages of small speaker populations and/or the languages indigenous to markets that are otherwise presently relatively modest.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

Appendix A - Base-Sign Inventory

New Consonants: plosives

| PLACE: MANNER/VOICE | New | IPA | XSAMPA | WORLD |
|---|---|---|---|---|
| bilabial : plosive/-v | pp | p | p | p |
| bilabial : plosive/+v | pb | b | b | b |
| dental : plosive/-v | dp | t̪ | t_d | t[ |
| dental : plosive/+v | db | d̪ | d_d | d[ |
| alveolar : plosive/-v | tp | t | t | t |
| alveolar : plosive/+v | tb | d | d | d |
| alveo-palatal : plosive/-v | gp | - | t_- | - |
| alveo-palatal : plosive/+v | gb | - | d_- | - |
| retroflex : plosive/-v | rp | ʈ | t` | tr |
| retroflex : plosive/+v | rb | ɖ | d` | dr |
| palatal : plosive/-v | jp | c | c | c |
| palatal : plosive/+v | jb | ɟ | j | J |
| velar : plosive/-v | kp | k | k | k |
| velar : plosive/+v | kb | g | g | g |
| uvular : plosive/-v | qp | q | q | q |
| uvular : plosive/+v | qb | ɢ | G | Q |
| pharyngeal : plosive/-v | xp | - | - | - |
| pharyngeal : plosive/+v | xb | - | - | - |
| epiglottal : plosive/-v | cp | ʡ | >/ | ?H |
| glottal : plosive/-v | hp | ʔ | ? | ? |

New Consonants: nasals

| PLACE: MANNER/VOICE | New | IPA | XSAMPA | WORLD |
|---|---|---|---|---|
| bilabial : nasal (+v) | pn | m | m | m |
| labio-dental : nasal (+v) | fn | ɱ | F | M |
| dental : nasal (+v) | dn | n̪ | n_d | n[ |
| alveolar : nasal (+v) | tn | n | n | n |
| alveo-palatal : nasal (+v) | gn | - | n_- | nj |
| retroflex : nasal (+v) | rn | ɳ | n` | nr |
| palatal : nasal (+v) | jn | ɲ | J | n~ |
| velar : nasal (+v) | kn | ŋ | N | N |
| uvular : nasal (+v) | qn | ɴ | N\ | Nq |

New Consonants: nasal taps/flaps

| PLACE: MANNER/VOICE | New | IPA | XSAMPA | WORLD |
|---|---|---|---|---|
| dental : nasal tap/flap (+v) | dm | ɾ̃ | - | - |
| alveolar : nasal tap/flap (+v) | tm | ɾ̃ | - | n( |
| alveo-palatal : nasal tap/flap (+v) | gm | - | - | - |
| retroflex : nasal tap/flap (+v) | rm | ɽ̃ | - | - |

New Consonants: taps/flaps

| PLACE: MANNER/VOICE | New | IPA | XSAMPA | WORLD |
|---|---|---|---|---|
| bilabial : tap/flap (+v) | pd | – | - | b( |
| dental : tap/flap (+v) | dd | ɾ̪ | - | - |
| alveolar : tap/flap (+v) | td | ɾ | 4, r | d( |
| alveolar-lateral : tap/flap (+v) | ld | ɭ | l\ | l( |
| alveo-palatal : tap/flap (+v) | gd | – | - | r( |
| retroflex : tap/flap (+v) | rd | ɽ | - | rr |
| uvular : tap/flap (+v) | qd | – | - | - |

New Consonants: trills

| PLACE: MANNER/VOICE | New | IPA | XSAMPA | WORLD |
|---|---|---|---|---|
| bilabial : trill (+v) | pr | B | B\ | B |
| dental : trill (+v) | dr | r̪ | - | - |
| alveolar : trill (+v) | tr | r | rr | r |
| alveo-palatal : trill (+v) | gr | – | - | - |
| retroflex : trill (+v) | rr | – | - | - |
| uvular : trill (+v) | qr | R | R\ | R |

New Consonants: fricatives

| PLACE: MANNER/VOICE | New | IPA | XSAMPA | WORLD |
|---|---|---|---|---|
| bilabial : fricative/-v | ps | ɸ | p\ | F |
| bilabial : fricative/+v | pz | β | B | V |
| labio-dental : fricative/-v | fs | f | f | f |
| labio-dental : fricative/+v | fz | v | v | v |
| labio-velar : fricative/-v | bs | ʍ | W | - |
| dental : fricative/-v | ds | s̪ | s_d | s[ |
| dental : fricative/+v | dz | z̪ | z_d | z[ |
| alveolar : fricative/-v | ts | s | s | s |
| alveolar : fricative/+v | tz | z | z | z |
| alveo-palatal : fricative/-v | gs | ʃ | S | S |
| alveo-palatal : fricative/+v | gz | ʒ | Z | Z |
| retroflex : fricative/-v | rs | ʂ | s` | sr |
| retroflex : fricative/+v | rz | ʐ | z` | zr |
| palatal : fricative/-v | js | ç | C | C |
| palatal : fricative/+v | jz | ʝ | j\ | j- |
| velar : fricative/-v | ks | x | x | x |
| velar : fricative/+v | kz | ɣ | G | G |
| uvular : fricative/-v | qs | X | X | X |
| uvular : fricative/+v | qz | ʁ | R | K |
| pharyngeal : fricative/-v | xs | ħ | - | HH |
| pharyngeal : fricative/+v | xz | ʕ | - | HH_v |

| PLACE: MANNER/VOICE | New | IPA | XSAMPA | WORLD |
|---|---|---|---|---|
| epiglottal : fricative/-v | cs | ʜ | H\ | H |
| epiglottal : fricative/+v | cz | ʢ | <\ | H_v |
| glottal : fricative/-v | hs | h | h | h |
| glottal : fricative/+v | hz | ɦ | hv | hv |

New Consonants: lateral fricatives

| PLACE: MANNER/VOICE | New | IPA | XSAMPA | WORLD |
|---|---|---|---|---|
| dental : lateral fricative/-v | dj | ɬ̪ | - | - |
| dental : lateral fricative/+v | dy | ɮ̪ | - | - |
| alveolar : lateral fricative/-v | tj | ɬ | K | hl |
| alveolar : lateral fricative/+v | ty | ɮ | K\ | Zl |
| alveo-palatal : lateral fricative/-v | gj | – | - | - |
| alveo-palatal : lateral fricative/+v | gy | – | - | - |

New Consonants: affricates

| PLACE: MANNER/VOICE | New | IPA | XSAMPA | WORLD |
|---|---|---|---|---|
| bilabial : affricate/-v | pf | pɸ | - | pF |
| bilabial : affricate/+v | pv | bβ | - | bV |
| labio-dental : affricate/-v | ff | pf | pf | pf |
| labio-dental : affricate/+v | fv | bv | - | pv |
| dental : affricate/-v | df | t̪s̪ | - | - |
| dental : affricate/+v | dv | d̪z̪ | - | - |
| alveolar : affricate/-v | tf | ts | ts | ts |
| alveolar : affricate/+v | tv | dz | dz | dz |
| alveo-palatal : affricate/-v | gf | tʃ | tS | tS |
| alveo-palatal : affricate/+v | gv | dʒ | dZ | dZ |
| retroflex : affricate/-v | rf | tʂ | - | ts_r |
| retroflex : affricate/+v | rv | dʐ | - | - |
| palatal : affricate/-v | jf | cç | - | cC |
| palatal : affricate/+v | jv | ɟʝ | - | Jj |
| velar : affricate/-v | kf | kx | - | kx |
| velar : affricate/+v | kv | gɣ | - | gG |
| uvular : affricate/-v | qf | qχ | - | qX |
| uvular : affricate/+v | qv | ɢʁ | - | QK |

New Consonant: approximates

| PLACE: MANNER/VOICE | New | IPA | XSAMPA | WORLD |
|---|---|---|---|---|
| labio-dental : approx. (+v) | fw | ʋ | P, v\ | V[ |
| labio-palatal : approx. (+v) | mw | ɥ | H | jw |
| labio-velar : approx. (+v) | bw | w | w | w |
| alveolar : approx. (+v) | tw | ɹ | r\. | 9 |
| retroflex : approx. (+v) | rw | ɻ | r\ | 9r |

| | New | IPA | XSAMPA | WORLD |
|---|---|---|---|---|
| palatal : approx. (+v) | jw | j | j | j |
| velar : approx. (+v) | kw | ɰ | M\ | 4) |
| lab-dent : lateral approx. (+v) | fl | – | - | V[ |
| dental : lateral approx. (+v) | dl | l̪ | - | - |
| alveolar : lateral approx. (+v) | tl | l | l | l |
| retroflex : lateral approx. (+v) | rl | ɭ | l` | lr |
| palatal : lateral approx. (+v) | jl | ʎ | L | L |
| velar : lateral approx. (+v) | kl | ʟ | L\ | Lg |

New Vowels

| BACKNESS/+-R : OPENNESS | New | IPA | XSAMPA | WORLD |
|---|---|---|---|---|
| front/-r : close | ii | i | i | i |
| front/+r : close | yi | y | y | y |
| front/-r : close, lax | ih | ɪ | I | I |
| front/+r : close, lax | yh | ʏ | Y | Y |
| front/-r : close-mid | ie | e | e | e |
| front/+r : close-mid | ye | ø | 2 | 7 |
| front/-r : open-mid | io | ɛ | E | E |
| front/+r : open-mid | yo | œ | 9 | 8 |
| front/-r : open2-mid | ic | æ | { | @ |
| central : open | ea | a | a | a |
| front/+r : open | ya | ɶ | & | 6 |
| central/-r : close | ei | ɨ | 1 | ix |
| central/+r : close | oi | ʉ | } | ux |
| central/-r : close-mid | ee | ɘ | @\ | - |
| central/+r : close-mid | oe | ɵ | 8 | ox |
| central (schwa) | ex | ə | @ | & |
| Schwar | er | ɚ | 3r | 3r |
| central/-r : open-mid | eo | ɜ | 3 | @: |
| central/+r : open-mid | oo | ɞ | 3\ | - |
| central : open2-mid | ec | ɐ | 6 | ax |
| back/-r : close | ai | ɯ | M | 4 |
| back/+r : close | ui | u | u | u |
| back/+r : close, lax | uh | ʊ | U | U |
| back/-r : close-mid | ae | ɤ | 7 | 2 |
| back/+r : close-mid | ue | o | o | o |
| back/-r : open-mid | ao | ʌ | V | ^ |
| back/+r : open-mid | uo | ɔ | O | > |
| back/-r : open | aa | ɑ | A | A |
| back/+r : open | ua | ɒ | Q | 5 |

Appendix B

| Phonetic description | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|
| bilabial/plosive -v | pp | | | pp^1 | pp^2 | | | | | | | | | | |
| bilabial/plosive -v/-rel | pp_z_ | | | [10] | [10] | pp^3 | | | | | | | | | |
| bilabial/plosive -v/preasp | pp_w_ | | | | | [10] | pp^4 | | | | | | | | |
| bilabial/plosive -v/lab | pp_p_ | | | | | | [9] | pp^5 | | | | | | | |
| bilabial/plosive -v/long | pp_:_ | | | | | | | [8] | | | | | | | |
| bilabial/plosive -v/pal | pp_j_ | | | | | | | pp_h_^1 | | | | | | | |
| bilabial/plosive -v/laryn | pp_h_ | | | | | | | [7] | | pp^6 | | | | | |
| bilabial/plosive -v/impl | pp_q_ | | | | | | | pp_t_^1 | | [4] | | | | | |
| bilabial/plosive -v/ejec | pp_t_ | | | | | | | [6] | | | | | | | |
| bilabial/plosive -v/asp/pal | pp_cj_ | | | | | pp_cj_^1 | | pp_c_^3 | | | | | | | |
| bilabial/plosive -v/asp/vel/lab | pp_ckp_ | | | | | [7] | pp_c_^2 | [6] | | | | | | | |
| bilabial/plosive -v/asp | pp_c_ | | | | | pp_c_^1 | [8] | | | | | | | | |
| bilabial/plosive -v/long/asp | pp_:c_ | | | | | [10] | | | | | | | | | |
| | | | | | | | | | | pp^7 | | | | | |
| bilabial/plosive +v | pb | | | pb^1 | pb^2 | | | | | [3] | | | | | |
| bilabial/plosive +v/-rel | pb_z_ | | | [10] | [10] | pb^3 | | | | | | | | | |
| bilabial/plosive +v/lab | pb_p_ | | | | | [9] | pb^4 | pb^5 | | | | | | | |
| bilabial/plosive +v/long | pb_:_ | | | | | | [8] | [8] | | | pp^8 | | | | |
| bilabial/plosive +v/pal | pb_j_ | | | | | | | pb^6 | | | [5] | | | | |
| bilabial/plosive +v/laryn | pb_h_ | | | | | | | [8] | | | | pp^9 | | | |
| bilabial/plosive +v/prenas | pb_n_ | | | | | | pb_n_^1 | pb_n_^2 | pb^7 | | | [2] | | | |
| bilabial/plosive +v/prenas/lab | pb_np_ | | | | | | [8] | [9] | [7] | | | | | | |
| bilabial/plosive +v/nasal | pb_~_ | | | | | | | | | | | | | | |
| bilabial/plosive +v/impl | pb_q_ | | | | | | | pb_q_^1 | | | | | | | |
| bilabial/plosive +v/ejec | pb_t_ | | | | | | | [7] | pb_q_^2 | | | | | | |
| bilabial/plosive +v/asp | pb_c_ | | | | | | | pb_c_^1 | [7] | | | | | | |
| bilabial/plosive +v/asp/pal | pb_cj_ | | | | | | | [8] | | | | | | | |
| | | | | | | | | | | | | | | | |
| labio-velar/plosive -v | bp | | | | | | | | | bp^1 | | | | | |
| labio-velar/plosive +v | bb | | | | | | | bb^1 | | [6] | bp^2 | | | | |
| labio-velar/plosive +v/prenas | bb_n_ | | | | | | | [9] | | | [6] | | | | |
| | | | | | | | | | | | | | | | |
| bilabial/affricate -v | pf | | | | | | | | | | | | | | |
| | | | | | | | | | | | | | | | |
| bilabial/fricative -v | ps | | | | | ps^1 | | | | | | | | | |
| bilabial/fricative -v/lab | ps_p_ | | | | ps_p_^1 | [8] | ps^2 | | | | | | | pp^10 | |
| bilabial/fricative -v/vel/lab | ps_kp_ | | | | [7] | | [7] | ps^3 | | | | | | [2] | |
| bilabial/fricative -v/pal | ps_j_ | | | | | | | [7] | ps^4 | | | | | | |

| | | | | | | | | | | | |
|---|---|---|---|---|---|---|---|---|---|---|---|
| bilabial/fricative -v/ejec | ps_t_ | | | | | [4] | ps^5 [7] | | | | |
| bilabial/fricative +v | pz | | | | | pz^1 [7] | | fs^5 [4] | | | |
| bilabial/fricative +v/pal | pz_j_ | | | | | pz^1 [8] | | | | | |
| labio-velar/fricative -v | bs | | | | | | | | | | |
| labio-dental/fricative -v | fs | | | | fs^1 [10] | fs^2 [9] | fs^3 [8] | fs^4 [2] | | | |
| labio-dental/fricative -v/long | fs_:_ | | | | | | | | | | |
| labio-dental/fricative -v/pal | fs_j_ | | | | | | | | | | |
| labio-dental/fricative -v/ejec | fs_t_ | | | | | | | | | | |
| labio-dental/fricative +v | fz | | | | | fz^1 [9] | | | | | |
| labio-dental/fricative +v/pal | fz_j_ | | | | | | | | | | |
| bilabial/nasal +v | pn | | | | | | | | | | |
| bilabial/nasal +v/lab | pn_p_ | | pn_p_^1 [9] | pn^1 [9] | pn^2 [10] | pn^3 [8] | | | | | |
| bilabial/nasal +v/vel/lab | pn_kp_ | | | | | | pn^4 [7] | pn^5 [7] | pn^6 [7] | pn^7 [7] | |
| bilabial/nasal +v/asp | pn_c_ | | | | | | | | | | |
| bilabial/nasal +v/long | pn_:_ | | | | | | | | | | |
| bilabial/nasal +v/pal | pn_j_ | | | | pn_h_^1 [8] | | | | | | |
| bilabial/nasal +v/laryn | pn_h_ | | | | | | | | | | |
| bilabial/nasal -v | pn_o_ | | | | | | | | | | |
| labio-dental/nasal +v | fn | | | | | | | | | | |
| bilabial/trill +v | pr | | | | | | | | | | tp^13 [2] |
| alveolar/plosive -v | tp | tp^1 [10] | tp^2 | | | | | | | | |
| dental/plosive -v | dp | | | | | | | | | | |
| alveolar/plosive -v/-rel | tp_z_ | tp_z_^1 [10] | tp^3 [10] | | | | | | | | |
| dental/plosive -v/-rel | dp_z_ | [10] | | | | | | | | | |
| alveolar/plosive -v/preasp | tp_w_ | | | tp^4 [9] | tp^5 [8] | | | | | | |
| alveolar/plosive -v/lab | tp_p_ | | | | | | | | | | |
| alveolar/plosive -v/long | tp_:_ | | | tp_:_^1 [10] | | tp^6 [6] | | | | | |
| dental/plosive -v/long | dp_:_ | | | | | | | | | | |
| alveolar/plosive -v/pal | tp_j_ | | | tp_j_^1 [10] | | | | | | | |
| dental/plosive -v/pal | dp_j_ | | | | | | | | | | |
| alveolar/plosive -v/pharyn | tp_x_ | tp_x_^1 [10] | | tp_x_^4 [7] | | | | | | | |
| dental/plosive -v/pharyn | dp_x_ | | tp_x_^2 [9] | tp_x_^3 [8] | | tp^7 [4] | | | | | |
| dental/plosive -v/long/pharyn | dp_:x_ | | | | | | | | | | |

| | | | | | | | | |
|---|---|---|---|---|---|---|---|---|
| alveolar/plosive -v/laryn | tp_h_ | | | | | | | |
| alveolar/plosive -v/impl | tp_q_ | | tp_q_^1 [10] | tp_t_^2 [7] | | | | |
| dental/plosive -v/impl | dp_q_ | | | | | | | |
| alveolar/plosive -v/ejec | tp_t_ | | tp_t_^1 [10] | | tp_c_^4 [6] | | | |
| dental/plosive -v/ejec | dp_t_ | | | | | | | |
| alveolar/plosive -v/asp/pal | tp_cj_ | | tp_ck_^1 [9] | | | | | |
| alveolar/plosive -v/asp/vel | tp_ck_ | | | | | | | |
| alveolar/plosive -v/asp | tp_c_ | tp_c_^1 | | tp_c_^3 [9] | | | | |
| dental/plosive -v/asp | dp_c_ | [10] | tp_c_^2 [9] | | | | | |
| alveolar/plosive -v/long/asp | tp_:c_ | | [10] | | | tp^8 [2] | | |
| alveolar/plosive +v | tb | tb^1 [10] | tb^2 | | | | | |
| dental/plosive +v | db | | | | | | | |
| alveolar/plosive +v/-rel | tb_z_ | tb_z_^1 [10] | [10] | tb^3 [9] | | | | |
| dental/plosive +v/-rel | db_z_ | | | | | | | |
| alveolar/plosive +v/long | tb_:_ | | tb_:_^1 [10] | | | | | |
| dental/plosive +v/long | db_:_ | | | tb^4 [9] | | | | |
| alveolar/plosive +v/nasal | tb_~_ | | tb_~_^1 [10] | | | | | |
| dental/plosive +v/nasal | db_~_ | | | | | | | |
| alveolar/plosive +v/prenas | tb_n_ | tb_n_^1 | tb_n_^2 | tb_n_^4 [9] | | | | |
| dental/plosive +v/prenas | db_n_ | [10] | | | | | | |
| alveolar/plosive +v/long/prenas | tb_:n_ | [9] | tb_n_^3 [8] | | tb^5 [6] | | | |
| alveolar/plosive +v/prenas/lab | tb_np_ | | | | | tb^6 [5] | | |
| alveolar/plosive +v/pal/prenas | tb_jn_ | | | | | | tp^9 [5] | |
| alveolar/plosive +v/pal | tb_j_ | tb_j_^1 [10] | tb_j_^2 [9] | tb_j_^3 [9] | | | | |
| dental/plosive +v/pal | db_j_ | | | | | | | |
| alveolar/plosive +v/vel | tb_k_ | | | | | | | |
| alveolar/plosive +v/pharyn | tb_x_ | tb_x_^1 [10] | tb_x_^2 | tb_j_^4 [8] | | | | |
| dental/plosive +v/pharyn | db_x_ | | [9] | | | | | |
| dental/plosive +v/long/pharyn | db_:x_ | | | tb_x_^3 [9] | | | | |
| dental/plosive +v/laryn | db_h_ | | tb_h_^1 [10] | | | | | |
| alveolar/plosive +v/laryn | tb_h_ | | | | | | | |
| alveolar/plosive +v/impl | tb_q_ | | tb_q_^1 [10] | tb_q_^2 [7] | | | | |
| dental/plosive +v/impl | db_q_ | | | | tb_q_^3 [8] | | | |
| alveolar/plosive +v/ejec | tb_t_ | | | tb_c_^1 [10] | | | | |
| alveolar/plosive +v/asp | tb_c_ | | | | | | | |
| dental/plosive +v/asp | db_c_ | | | | | | | |
| retroflex/plosive -v | rp | | rp^1 [9] | rp^2 [8] | | | | |
| retroflex/plosive -v/long | rp_:_ | | | | rp^3 | | | |
| retroflex/plosive -v/laryn | rp_h_ | | | | | | | |

| Category | | | | | | | |
|---|---|---|---|---|---|---|---|
| retroflex/plosive -v/ejec | rp_t_ | | | | [6] | | |
| retroflex/plosive -v/asp | rp_c_ | | | rp_c_^1 | rp_c_^2 | | |
| retroflex/plosive -v/long/asp | rp_:c_ | | | [10] | [8] | | |
| | | | | | | rp^4 [5] | |
| retroflex/plosive +v | rb | | rb^1 [10] | | | | |
| retroflex/plosive +v/long | rb_:_ | | | rb^2 | rb^3 [8] | | |
| retroflex/plosive +v/prenas | rb_n_ | | rb_n_^1 [9] | | | | |
| retroflex/plosive +v/nasal | rb_~_ | | | | rb^4 [6] | | |
| retroflex/plosive +v/laryn | rb_h_ | | | rb_h_^1 | | | |
| retroflex/plosive +v/long/laryn | rb_:h_ | | | [10] | | | |
| retroflex/plosive +v/ejec | rb_t_ | | | | | | |
| retroflex/plosive +v/asp | rb_c_ | | | rb_c_^1 [8] | | | |
| | | | | | | | tp^10 [2] |
| alveolar/affricate -v | tf | tf^1 [10] | tf^2 | | | | |
| dental/affricate -v | df | | | | | | |
| alveolar/affricate -v/long | tf_:_ | tf_:_^1 | [10] | | | | |
| alveolar/affricate -v/long/lab | tf_:p_ | [9] | | tf^3 [7] | tf^4 [8] | | |
| alveolar/affricate -v/pal | tf_j_ | tf_j_^1 | | | | | |
| dental/affricate -v/pal/lat | df_jl_ | [9] | tf_j_^2 | | | | |
| alveolar/affricate -v/vel | tf_k_ | tf_h_^1 | [8] | | | | |
| alveolar/affricate -v/laryn | tf_h_ | [9] | | | | tf^5 [4] | |
| alveolar/affricate -v/lat | tf_l_ | | | | | | |
| alveolar/affricate -v/lab/ejec | tf_pt_ | | tf_pt_^1 | | | | |
| alveolar/affricate -v/lat/lab/ejec | tf_lpt_ | | [8] | tf_t_^2 | | | |
| alveolar/affricate -v/ejec | tf_t_ | | tf_t_^1 | [7] | | | |
| dental/affricate -v/ejec | df_t_ | | [10] | | tf_c_^4 [6] | | |
| alveolar/affricate -v/asp/lab | tf_cp_ | | | | | tf^6 [4] | |
| alveolar/affricate -v/asp/lat | tf_cl_ | | | tf_c_^3 | | | |
| alveolar/affricate -v/asp | tf_c_ | tf_c_^1 | tf_c_^2 | [8] | | | |
| dental/affricate -v/asp | df_c_ | [10] | [8] | | | | |
| | | | | | | | tf^7 [5] |
| alveolar/affricate +v | tv | tv^1 [10] | | | | | |
| dental/affricate +v | dv | | tv^2 | tv^3 [8] | | | |
| alveolar/affricate +v/prenas | tv_n_ | | [9] | | tv^4 [7] | | |
| alveolar/affricate +v/vel | tv_k_ | | | | | tv^5 [6] | |
| alveolar/affricate +v/lat | tv_l_ | | | | | | |
| alveolar/affricate +v/ejec | tv_t_ | | | tv_c_^1 | | | |
| alveolar/affricate +v/asp | tv_c_ | | | [7] | | | |
| | | | | | | | |
| retroflex/affricate -v | rf | | | | | | |
| retroflex/affricate -v/ejec | rf_t_ | | | rf_c_^1 | rf^1 | | |

| | | | | | | | | | | |
|---|---|---|---|---|---|---|---|---|---|---|
| retroflex/affricate -v/asp | rf_c_ | | | | | [7] | [5] | rf^2 [6] | | tp^11 [2] | tp^12 [2] |
| retroflex/affricate +v | rv | | | | | | | rv^1 [9] | | | |
| retroflex/affricate +v/prenas | rv_n_ | | | | | | | | | | |
| | | | | | | | | | | | |
| alveolar/fricative -v | ts | ts^1 [10] | | | | | | | | | |
| dental/fricative -v | ds | | ts^2 [9] | ts^3 [7] | | | | | | | |
| alveolar/fricative -v/preasp | ts_w_ | | | | ts^4 [8] | | | | | | |
| alveolar/fricative -v/lab | ts_p_ | | | | | | | | | | |
| alveolar/fricative -v/long | ts_:_ | | | ts_:_^1 [10] | | | | | | | |
| dental/fricative -v/long | ds_:_ | | | | | | | | | | |
| alveolar/fricative -v/pal | ts_j_ | | ts_j_^1 [10] | | | ts^5 [5] | ts^6 [3] | | | | |
| dental/fricative -v/pal | ds_j_ | | | | | | | | | | |
| alveolar/fricative -v/pharyn | ts_x_ | | | ts_h_^3 [7] | | | | | | | |
| alveolar/fricative -v/laryn | ts_h_ | ts_h_^1 [8] | ts_h_^2 [7] | | ts_h_^4 [7] | | | | | | |
| dental/fricative -v/long/pharyn | ds_:x_ | ds_x_^1 [9] | | | | | | | | | |
| dental/fricative -v/pharyn | ds_x_ | [9] | | | | | | | | | |
| alveolar/fricative -v/ejec | ts_t_ | | | ts_c_^1 [7] | | | | | | | |
| alveolar/fricative -v/asp | ts_c_ | | | | | | | ts^7 [2] | | | |
| dental/fricative -v/-sib | ds_v_^0 | | | | | | | | | | |
| | | | | | | | | | | | |
| alveolar/fricative +v | tz | tz^1 [10] | | | | | | | ts^8 [5] | | |
| dental/fricative +v | dz | | tz^2 [8] | | | | | | | | |
| alveolar/fricative +v/long | tz_:_ | tz_:_^1 [10] | | tz^3 [8] | | | | | | | |
| dental/fricative +v/long | dz_:_ | | | | | | | | | | |
| alveolar/fricative +v/prenas | tz_n_ | | | | | | | | | | |
| alveolar/fricative +v/pal | tz_j_ | | tz_j_^1 [10] | | tz^4 [7] | tz^5 [3] | | | ts^9 [5] | | |
| dental/fricative +v/pal | dz_j_ | | | | | | | | | | |
| alveolar/fricative +v/pharyn | tz_x_ | | | tz_j_^2 | | | | | | | |
| dental/fricative +v/long/pharyn | dz_:x_ | dz_x_^1 [8] | tz_x_^1 [10] | [8] | | | | | | | |
| dental/fricative +v/pharyn | dz_x_ | [8] | [10] | | | | | | | | |
| dental/fricative +v/-sib | dz_v_ | | | | | | | | | | |
| dental/fricative +v/pal/-sib | dz_jv_ | | | dz_jv_^1 [9] | dz_v_^2 [4] | | | | | | |
| dental/fricative +v/-sib/pharyn | dz_vx_ | | | | | | | | | | |
| | | | | | | | | | | | |
| retroflex/fricative -v | rs | | | | | | | rs^1 [6] | | | |
| retroflex/fricative -v/ejec | rs_t_ | | | | | | | | | | |
| | | | | | | | | | | rs^2 [4] | |
| retroflex/fricative +v | rz | | | | | | | rz^1 [7] | | | |
| retroflex/fricative +v/laryn | rz_h_ | | | | | | | | | | |

| Description | c1 | c2 | c3 | c4 | c5 | c6 | c7 | c8 |
|---|---|---|---|---|---|---|---|---|
| alveolar/lateral fricative -v | tj | | | tj^1 [8] | tj^2 [7] | tj^3 [6] | | |
| dental/lateral fricative -v/long | dj_:_ | | | | | | | |
| dental/lateral fricative -v/pal | dj_j_ | | | | | | | |
| alveolar/lat fricative -v/ejec | tj_t_ | | | | | tj^4 [5] | tj^5 [6] | |
| alveolar/lateral fricative +v | tʲ | | | ty^1 | | | | |
| dental/lateral fricative +v/pal | dy_j_ | | | [7] | | | | |
| alveo-palatal/lateral fricative -v | gj | | | | | gj^1 [6] | | |
| alveo-palatal/lateral fricative +v | gy | | | | | | | |
| alveolar/lat approx +v | tl | | tl^1 [10] | tl^2 [9] | tl^3 [8] | | | |
| dental/lat approx +v | dl | | | | | | | |
| alveolar/lat approx +v/asp | tl_c_ | | | | | | | |
| alveolar/lat approx +v/long | tl_:_ | | | tl_:_^1 [10] | | | | |
| dental/lat approx +v/long | dl_:_ | | | | | | | |
| alveolar/lat approx +v/pal | tl_j_ | tl_j_^1 [10] | tl_j_^2 [7] | | tl^4 [7] | tl^5 [6] | tl^6 [5] | |
| dental/lat approx +v/pal | dl_j_ | | | | | | | |
| alveolar/lat approx/pal -v | tl_jo_ | | | tl_k_^3 [8] | | | | |
| alveolar/lat approx +v/vel | tl_k_ | tl_k_^1 [8] | tl_k_^2 [7] | tl_k_^4 [8] | | | | |
| alveolar/lat approx +v/long/vel | tl_:k | | | | | | | |
| alveolar/lat approx/vel -v | tl_ko_ | | | | | | | |
| alveolar/lat approx +v/pharyn | tl_x_ | | | tl_h_^1 [9] | | | | |
| alveolar/lat approx +v/laryn | tl_h_ | | | | | | | |
| alveolar/lat approx -v | tl_o_ | | | | tl_o_^1 [10] | | | |
| dental/lat approx -v | dl_o_ | | | | | | | |
| retroflex/lat approx +v | rl | | | | | rl^1 [9] | | |
| retroflex/lat approx -v | rl_o_ | | | | | | | |
| alveolar/trill +v | tr | tr^1 [10] | tr^2 [8] | | | | | tl^7 [2] |
| dental/trill +v | dr | | | | | | | |
| alveolar/trill +v/long | tr_:_ | | | | | | | |
| alveolar/trill +v/pal | tr_j_ | tr_j_^1 [10] | tr_h_^2 [7] | tr^3 [7] | | | | |
| dental/trill +v/pal | dr_j_ | | | | | | | |
| alveolar/trill +v/vel | tr_k_ | tr_h_^1 [9] | | | | | | |
| alveolar/trill +v/laryn | tr_h_ | | | tr^4 [6] | tr^5 [5] | | | |
| alveolar/trill -v | tr_o_ | | | | | | | |
| alveo-palatal/trill +v | gr | | | | | | | |

| Category | col1 | col2 | col3 | col4 | col5 | col6 | col7 | col8 |
|---|---|---|---|---|---|---|---|---|
| retroflex/trill +v | rr | | | rr^1 [7] | | | | |
| uvular/trill +v | qr | | | | | tr^6 [3] | tr^7 [6] | |
| alveolar/tap +v | td | | td^1 [10] | | | | | |
| dental/tap +v | dd | | | | | | | |
| alveolar/tap +v/pal | td_j_ | td_j_^1 [7] | td^2 [7] | | | | | |
| alveolar/tap/pal -v | td_jo_ | | | | | | | |
| alveolar/tap/vel -v | td_ko_ | td_h_^1 [8] | | td^3 [7] | | | | tn^8 [2] |
| dental/tap +v/laryn | dd_h_ | [8] | | | | | | |
| alveolar-lateral/tap +v | ld | | ld^1 [7] | | td^4 [7] | | | |
| alveolar-lateral/tap +v/pal | ld_j | | | | | | | |
| alveo-palatal/tap +v | gd | | | rd^2 [8] | | | | |
| retroflex/tap +v | rd | | | | | | | |
| retroflex/tap +v/lat | rd_l_ | | td_l_^1 [7] | rd^1 [7] | | | | |
| retroflex/tap +v/laryn/lat | rd_hl_ | | | | | | | |
| alveolar/approx +v | tw | | | | | | | |
| retroflex/approx +v | rw | | | | | | tw^1 [7] | |
| alveolar/nasal +v | tn | | tn^1 [10] | tn^2 [6] | tn^3 [10] | | | |
| dental/nasal +v | dn | | | | | tn^4 [8] | | |
| alveolar/nasal +v/lab | tn_p_ | | | | | | | |
| dental/nasal +v/asp | dn_c_ | | | | | | | |
| alveolar/nasal +v/long | tn_:_ | | | tn_:_^1 [10] | | | | |
| dental/nasal +v/long | dn_:_ | | | | | | | |
| alveolar/nasal +v/pal | tn_j_ | | tn_j_^1 [10] | | | tn^5 [6] | tn^6 [5] | |
| dental/nasal +v/pal | dn_j_ | | | tn_j_^2 [5] | | | | |
| alveolar/nasal/pal -v | tn_jo_ | | | | tn_j_^3 [8] | | | tn^7 [4] |
| alveolar/nasal +v/vel | tn_k_ | | tn_k_^1 [8] | | tn_h_^2 [8] | | | |
| alveolar/nasal/vel -v | tn_ko_ | | [5] | | | | | |
| alveolar/nasal +v/laryn | tn_h_ | | | tn_h_^1 [5] | | | | |
| dental/nasal/laryn -v | dn_ho_ | | | | | | | |
| alveolar/nasal -v | tn_o_ | | | | | | | |
| retroflex/nasal +v | rn | | | | | | | rn^1 |

| Feature | Col1 | Col2 | Col3 | Col4 | Col5 | Col6 | Col7 |
|---|---|---|---|---|---|---|---|
| retroflex/nasal -v | m_o | | | | | [5] | |
| palatal/plosive -v | jp | | jp^1 [10] | jp^2 [5] | jp^3 [5] | | |
| alveo-palatal/plosive -v | gp | | | | | | |
| palatal/plosive -v/impl | jp_q_ | | jp_q_^1 [10] | | | | |
| alveo-palatal/plosive -v/impl | gp_q_ | | | | | | |
| palatal/plosive -v/ejec | jp_t_ | | jp_t_^1 [10] | | | | |
| alveo-palatal/plosive -v/ejec | gp_t_ | | | jp_c_^1 [8] | | | |
| palatal/plosive -v/asp | jp_c_ | | | | | | |
| | | | | | jp^4 [5] | | |
| palatal/plosive +v | jb | | jb^1 [10] | jb^2 | | | |
| alveo-palatal/plosive +v | gb | | | | jb^3 [6] | | |
| palatal/plosive +v/prenas | jb_n_ | | jb_n_^1 [9] | | | | |
| alveo-palatal/plosive +v/prenas | gb_n_ | | [10] | | | | |
| alveo-palatal/plosive +v/nasal | gb_~ | | | | jb^4 [5] | | |
| palatal/plosive +v/impl | jb_q_ | | jb_q_^1 [10] | jb_q_^2 | | | |
| alveo-palatal/plosive +v/impl | gb_q_ | | | | jb_q_^3 [10] | | |
| palatal/plosive +v/ejec | jb_t_ | | jb_t_^1 [10] | [8] | | | |
| alveo-palatal/plosive +v/ejec | gb_t_ | | | | | | |
| palatal/plosive +v/asp | jb_c_ | | | | | | |
| velar/plosive -v | kp | kp^1 [9] | kp^2 | | | | |
| velar/plosive -v/preasp | kp_w_ | | [8] | kp^3 [6] | | | |
| velar/plosive -v/long | kp_:_ | | | | kp^4 [6] | | |
| velar/plosive -v/pal | kp_j_ | | | | | | |
| velar/plosive -v/pharyn | kp_x_ | kp_h_^1 [8] | kp_h_^2 [7] | | | | |
| velar/plosive -v/laryn | kp_h_ | | | kp_p_^1 [8] | | | |
| velar/plosive -v/lab | kp_p_ | | | | kp^5 [4] | kp^7 [5] | |
| velar/plosive -v/long/lab | kp_:p_ | | | | | | |
| velar/plosive -v/impl | kp_q_ | | | kp_t_^3 [8] | | | |
| velar/plosive -v/lab/ejec | kp_pt_ | kp_t_^1 [7] | kp_t_^2 [6] | | | | |
| velar/plosive -v/pal/ejec | kp_jt_ | | | | kp_c_^4 [6] | | |
| velar/plosive -v/ejec | kp_t_ | | | | | | |
| velar/plosive -v/asp/lab | kp_cp_ | | | kp_c_^3 [7] | | | |
| velar/plosive -v/asp/pal | kp_cj_ | kp_c_^1 [8] | kp_c_^2 [7] | | kp^6 [2] | | |
| velar/plosive -v/long/asp | kp_:c_ | | | | | | |
| velar/plosive -v/asp | kp_c_ | | | | | | |
| velar/plosive +v | kb | kb^1 [8] | kb^2 [7] | kb^3 [7] | | | |
| velar/plosive +v/long | kb_: | | | | | | |
| velar/plosive +v/pal | kb_j_ | | | | | | |

| Category | | | | | | | | | |
|---|---|---|---|---|---|---|---|---|---|
| velar/plosive +v/lab | kb_p_ | | | | kb^4 [6] | | | | |
| velar/plosive +v/nasal | kb_-_ | | kb_n_^1 [9] | | | | | | |
| velar/plosive +v/prenas | kb_n_ | | | kb_n_^2 [7] | kb^5 [6] | | | | |
| velar/plosive +v/prenas/lab | kb_np_ | | | | | | | | |
| velar/plosive +v/impl | kb_q_ | | | kb_q_^1 [7] | | | | | |
| velar/plosive +v/ejec | kb_t_ | | | | kb_c_^2 [7] | | | | |
| velar/plosive +v/asp | kb_c_ | | | kb_c_^1 [7] | | | | | |
| velar/plosive +v/asp/lab | kb_cp_ | | | [7] | | | | | |
| | | | | | | | | kp^8 [2] | kp^9 [1] |
| uvular/plosive -v | qp | | | | | | | | |
| uvular/plosive -v/lab | qp_p_ | | qp_p_^1 [9] | qp^1 [7] | | | | | |
| uvular/plosive -v/long/lab | qp_:p_ | | | | | | | | |
| uvular/plosive -v/impl | qp_q_ | | | | qp^2 [5] | | | | |
| uvular/plosive -v/lab/ejec | qp_pt_ | qp_t_^1 [8] | qp_t_^2 | | | | | | |
| uvular/plosive -v/ejec | qp_t_ | | [8] | qp_c_^2 | | | | | |
| uvular/plosive -v/asp | qp_c_ | | qp_c_^1 [7] | [7] | qp^3 [5] | | | | |
| uvular/plosive -v/asp/lab | qp_cp_ | | [7] | | | | | | |
| -uvular/plosive +v | qb | | qb^1 [9] | | | qp^4 [7] | | | |
| uvular/plosive +v/long | qb_: | | | qb^2 [8] | qb^3 [6] | | | | |
| uvular/plosive +v/lab | qb_p_ | | | | | | hp^4 [5] | | |
| uvular/plosive +v/impl | qb_q_ | | | | | | | | |
| pharyngeal/plosive -v | xp | | | xp^1 | | | | | |
| pharyngeal/plosive +v | xb | | | | xp^2 [7] | | | | |
| epiglottal/plosive -v | cp | | | | | | | | |
| glottal/plosive -v | hp | | | hp^1 [9] | | | | | |
| glottal/plosive -v/long | hp_: | | | | hp^2 [7] | hp^3 [6] | | | |
| glottal/plosive -v/lab | hp_p_ | | | | | | | | |
| glottal/plosive -v/pharyn | hp_x | | | | | | | | |
| palatal/affricate -v | jf | gf^1 [10] | | | | | | | |
| alveo-palatal/affricate -v | gf | | gf^2 [9] | | | | | | |
| alveo-palatal/affricate -v/preasp | gf_w | | | gf^3 [7] | gf^4 [8] | | | | |
| palatal/affricate -v/lab | jf_p_ | gf_p_^1 [10] | | | | | | | |
| alveo-palatal/affricate -v/lab | gf_p | | gf_p_2 [8] | | gf^5 [8] | | | | |
| alveo-palatal/affricate -v/long/lab | gf_:p_ | | | | | | | | |
| alveo-palatal/affricate -v/long | gf_:_ | | | | | | | | |

| Category | | | | | | | | | | |
|---|---|---|---|---|---|---|---|---|---|---|
| alveo-palatal/affricate -v/pal | gf_j_ | | | gf_k_^1 [8] | gf_k_^2 [8] | gf^6 [4] | | | | |
| alveo-palatal/affricate -v/vel | gf_k_ | | | | | | | | | |
| alveo-palatal/affricate -v/laryn | gf_h_ | | | | | | | | | |
| palatal/affricate -v/ejec | jf_t_ | | | gf_t_^1 [10] | gf_t_^2 [7] | | | | | |
| alveo-palatal/affricate -v/ejec | gf_t_ | | | | | | | | | |
| alveo-palatal/affricate -v/lab/ejec | gf_pt_ | | | | | | | | | |
| palatal/affricate -v/asp | jf_c_ | gf_c_^1 [10] | | | | gf_c_^5 [7] | gf^7 [2] | | | |
| alveo-palatal/affricate -v/asp | gf_c_ | | gf_c_^2 [9] | gf_c_^3 [7] | gf_c_^4 [7] | | | | | |
| alveo-palatal/affricate -v/long/asp | gf_:c_ | | | | | | | | | |
| alveo-palatal/affricate -v/asp/lab | gf_cp_ | | | | | | | | | |
| alveo-palatal/affricate -v/aps/pal | gf_cj_ | | | | | | | | | |
| palatal/affricate +v | jv | gv^1 [10] | | | | | | | | |
| alveo-palatal/affricate +v | gv | | gv^2 [8] | | | | | | | |
| palatal/affricate +v/lab | jv_p_ | gv_p_^1 [8] | | gv^3 [8] | | | | | | |
| alveo-palatal/affricate +v/lab | gv_p_ | [10] | | | gv^4 [8] | | | | | |
| alveo-palatal/affricate +v/long | gv_:_ | | | | | gv^5 [7] | gv^6 [5] | gf^8 [7] | | |
| alveo-palatal/affricate +v/prenas | gv_n_ | | | | | | | | | |
| alveo-palatal/affricate +v/pal | gv_j_ | | | gv_k_^1 [8] | | | | | | |
| alveo-palatal/affricate +v/vel | gv_k_ | | | | | | | | | |
| alveo-palatal/affricate +v/ejec | gv_t_ | | | gv_c_^1 [7] | | | | | | |
| alveo-palatal/affricate +v/asp | gv_c_ | | | | | | | | | |
| velar/affricate -v | kf | | | | | | | | | |
| velar/affricate -v/lab/ejec | kf_pt_ | kf_pt_^1 [8] | | kf_t_^1 [8] | kf^1 [6] | kf^2 [6] | | | | |
| velar/affricate -v/lat/ejec | kf_lt_ | | | kf_c_^2 [7] | | | | | | |
| velar/affricate -v/ejec | kf_t_ | | | kf_c_^1 [8] | | | | | | |
| velar/affricate -v/asp/lab | kf_cp_ | | | | | kf^3 [7] | | | | |
| velar/affricate -v/asp | kf_c_ | | | | | | | | | |
| velar/affricate +v | kv | | | | | | | | | |
| uvular/affricate -v | qf | | | qf^1 [7] | | | | | | |
| uvular/affricate -v/lab | qf_p_ | | | | qf^2 [7] | | | | | |
| uvular/affricate +v | qv | | | | | | | kp^10 [1] | kp^11 [2] | |
| palatal/fricative -v | js | gs^1 [10] | | | | | | | | |
| alveo-palatal/fricative -v | gs | | gs^2 [9] | | | | | | | |
| alveo-palatal/fricative -v/long | gs_:_ | | | gs^3 | | | | | | |
| alveo-palatal/fricative -v/lab | gs_p_ | | | gs_p_^1 [8] | gs^4 | | | | | tp^14 |

| Category | | | | | | | | | |
|---|---|---|---|---|---|---|---|---|---|
| alveo-palatal/fricative -v/long/lab | gs_:p_ | | [9] | | [8] | gs^5 [6] | | | [2] |
| alveo-palatal/fricative -v/pal | gs_j_ | | | | gs_k_^1 | | | | |
| alveo-palatal/fricative -v/vel | gs_k_ | | | | [9] | | | | |
| palatal/fricative -v/ejec | js_t_ | | | | gs_t_^1 | | gs^6 | | |
| alveo-palatal/fricative -v/ejec | gs_t_ | | | | [10] | | [4] | | |
| | | | | | | | | | |
| palatal/fricative +v | jz | | gz^1 | | | | | | |
| alveo-palatal/fricative +v | gz | | [10] | gz^2 | gz^3 | | | | |
| alveo-palatal/fricative +v/long | gz_:_ | | | [8] | [8] | gz^4 | | | |
| alveo-palatal/fricative +v/prenas | gz_n_ | | | | | [6] | | | |
| alveo-palatal/fricative +v/pal | gz_j_ | | | | gz_k_^1 | | | | |
| alveo-palatal/fricative +v/vel | gz_k_ | | | | [9] | | | | |
| | | | | | | | | ks^7 | |
| velar/fricative -v | ks | ks^1 | | | | | | [4] | |
| velar/fricative -v/long | ks_:_ | [9] | ks^2 | | ks^3 | | | | |
| velar/fricative -v/pal | ks_j_ | | [8] | | [6] | | | | |
| velar/fricative -v/lab/ejec | ks_pt_ | | ks_t_^1 | | | ks^4 [5] | | | |
| velar/fricative -v/ejec | ks_t_ | | [8] | | | | | | |
| velar/fricative -v/lab | ks_p_ | | | | ks_p_^1 | | | | |
| velar/fricative -v/lab | ks_:p_ | | | | [9] | | | | |
| | | | | | | | ks^5 [3] | | |
| .velar/fricative +v | kz | | kz^1 | | | | | | |
| velar/fricative +v/long | kz_:_ | | [8] | kz^2 | | | | | |
| velar/fricative +v/pal | kz_j_ | | kz_h_^1 | [6] | kz^3 | | | hs^7 | |
| velar/fricative +v/laryn | kz_h_ | | [8] | | [6] | | | [4] | |
| velar/fricative +v/lab | kz_p_ | | | | | ks^6 [5] | | | |
| | | | | | | | | | |
| uvular/fricative -v | qs | | qs^1 | | | | | | |
| uvular/fricative -v/long | qs_:_ | | [8] | qs^2 | | | | | |
| uvular/fricative -v/lab/ejec | qs_pt_ | | qs_t_^1 | [6] | qs^3 | | | | |
| uvular/fricative -v/ejec | qs_t_ | | [8] | | [6] | | | | |
| uvular/fricative -v/lab | qs_p_ | | | qs_p_^1 | | qs^4 | | | |
| uvular/fricative -v/long/lab | qs_:p_ | | | [9] | | [4] | | | |
| | | | | | | | | | |
| uvular/fricative +v | qz | | qz^1 | | | | | | |
| uvular/fricative +v/long | qz_:_ | | [9] | qz^2 | | | | | |
| uvular/fricative +v/lab | qz_p_ | | | [8] | | | | | |
| | | | | | | | | | |
| pharyngeal/fricative -v | xs | | | | xs^1 | | | | |
| pharyngeal/fricative -v/long | xs_:_ | | | | [9] | | | | |
| | | | | | | xs^2 | | | |

| Category | Code | | | | | | |
|---|---|---|---|---|---|---|---|
| pharyngeal/fricative +v | xz | | | | xz^1 [5] | | |
| pharyngeal/fricative +v/long | xz_:_ | | | | [9] | | |
| epiglottal/fricative -v | cs | | | | cs^1 [5] | hs^6 [5] | |
| epiglottal/fricative +v | cz | | | | | | |
| glottal/fricative -v | hs | hs^1 [10] | | | hs^5 [7] | | |
| glottal/fricative -v/long | hs_:_ | | hs^2 [9] | hs^3 [8] | | | |
| glottal/fricative -v/laryn | hs_h_ | | | | hs^4 [5] | | |
| glottal/fricative -v/lab | hs_p_ | | | | | | |
| glottal/fricative +v | hz | | | | | | |
| palatal/nasal +v | jn | | | | jn^1 [10] | jn^2 [9] | jn^3 [8] |
| alveo-palatal/nasal +v | gn | | | | | | |
| palatal/nasal +v/long | jn_:_ | | | | | | jn^4 [6] |
| palatal/nasal +v/laryn | jn_h_ | | | | | | |
| palatal/nasal -v | jn_o_ | | | | | | |
| velar/nasal +v | kn | | | | kn^1 [9] | | kn^5 [2] |
| velar/nasal +v/long | kn_:_ | | | | | | |
| velar/nasal +v/pal | kn_j_ | kn_j_^1 [6] | kn^2 [8] | kn^3 [7] | kn^4 [6] | | |
| velar/nasal/pal -v | kn_jo | | | | | | |
| velar/nasal +v/pharyn | kn_x_ | kn_h_^1 [9] | kn_h_^2 [7] | | | | kn^5 [5] |
| velar/nasal +v/laryn | kn_h_ | | | | | | |
| velar/nasal +v/lab | kn_p_ | | | | | | |
| velar/nasal -v | kn_o_ | | | | | | |
| uvular/nasal +v | gn | | | | | | |
| palatal/lat approx +v | jl | | | | jl^1 [8] | jl^2 [7] | |
| palatal/lat approx +v/vel | jl_k_ | | | | | | |
| velar/lat approx +v | kl | | | | | | jw^5 |
| palatal/approx +v | jw | | | | jw^1 [9] | jw^2 [8] | jw^3 [7] |
| palatal/approx +v/long | jw_:_ | | | | | | jw^4 [8] |
| palatal/approx +v/nasal | jw_~_ | | | | | | |
| palatal/approx -v | jw_o_ | | | | | | |
| palatal/approx +v/laryn | jw_h_ | | | | | | |

| Category | | | | | | | | |
|---|---|---|---|---|---|---|---|---|
| front -r/close | ii | | ii^1 [10] | ii^2 [10] | | | | |
| front -r/close/short | ii_s_ | | | | | | | |
| front -r/close/breathy | ii_c_ | | ii_o_^1 [10] | | | | | |
| front -r/close/-v | ii_o_ | | | | ii^3 [9] | | | |
| front -r/close/velar | ii_k_ | | | | | | | |
| front -r/close/pharyn | ii_x_ | | ii_h_^1 | ii_h_^2 [9] | | | | |
| front -r/close/laryn | ii_h_ | | [9] | | | | | |
| front -r/close/nasal/velar | ii_~k_ | | ii_~h_^1 | | | ii^4 [4] | | |
| front -r/close/nasal/laryn | ii_~h_ | | [9] | ii_~_^2 [7] | | | | |
| front -r/close/nasal/long | ii_~:_ | | ii_~_^1 [6] | | ii_:_^3 [4] | | ii^5 [3] | |
| front -r/close/nasal | ii_~_ | | | | | | | |
| front -r/close/long/pharyn | ii_:x_ | | ii_:_^1 [7] | | | | | |
| front -r/close/long | ii_:_ | | | ii_:_^2 [6] | | | | |
| front -r/close/palatal offglide | ii_j_ | | | | | | | |
| front -r/close/labial offglide | ii_w_ | ii_w_^1 | ii_j_^1 [6] | | | | | |
| front -r/close/central offglide | ii_e_ | [7] | | | | | | |
| | | | | | | | | |
| -front +r/close | yi | | | | | | | |
| front +r/close/long | yi_:_ | | | | yi^1 [5] | | | |
| front +r/close/palatal offglide | yi_j_ | | | yi_j_^2 [7] | | | ii^6 [4] | |
| front +r/close/labial offglide | yi_w_ | | yi_w^1 | yi_j_^1 [8] | | | | |
| front +r/close/central offglide | yi_e_ | | [8] | | | | | |
| | | | | | | | | |
| central -r/close | ei | | | ei^1 [10] | | | | |
| central -r/close/short | ei_s_ | | | | | | | |
| central -r/close/nasal/short | ei_~s_ | | ei_~_^1 [10] | | | | | |
| central -r/close/nasal | ei_~ | | | | ei^2 [6] | | | |
| central -r/close/long | ei_:_ | | | ei_j_^3 [6] | | | | ii^7 [4] |
| central -r/close/palatal offglide | ei_j_ | | ei_j_^2 [7] | | | el^3 [5] | | |
| central -r/close/labial offglide | ei_w_ | ei_w_^1 [7] | ei_j_^1 [7] | | | | | |
| central -r/close/central offglide | ei_e_ | | | | | | | |
| | | | | | | | | |
| central -r/close-mid | ee | | | | | | | |
| central -r/close-mid/palatal offglide | ee_j_ | | | | ee^1 [6] | | | |
| central -r/close-mid/labial offglide | ee_w_ | | ee_w_^1 [7] | ee_j_^1 [7] | | | | |
| central -r/close-mid/central offglide | ee_e_ | | | | | | | |
| | | | | | | | | |
| front -r/close-lax | ih | | | | ih^1 [7] | | | |
| front -r/close-lax/pharyn | ih_x_ | | | | | | | |
| front -r/close-lax/long | ih_:_ | | | ih_~_^1 | | | | |

| Category | | | | | | | | | |
|---|---|---|---|---|---|---|---|---|---|
| front -r/close-lax/nasal | ih_~_ | | | | [6] | ih^3 | | | |
| front -r/close-lax/palatal offglide | ih_j_ | | | | ih_j_^2 [6] | ih^4 | | | |
| front -r/close-lax/labial offglide | ih_w_ | | ih_w_^1 | ih_j_^1 | [6] | [5] | | | |
| front -r/close-lax/central offglide | ih_e_ | | [8] | [7] | | | | | |
| | | | | | | | | | |
| front +r/close-lax | yh | | | | | | | | |
| front +r/close-lax/ palatal offglide | yh_j_ | | | | | yh^1 | | | |
| front +r/close-lax/labial offglide | yh_w_ | | yh_w_^1 | yh_j_^1 | [7] | | | | |
| front +r/close-lax/labial offglide | yh_e_ | | [8] | [7] | | | | | |
| | | | | | | | | | |
| front -r/close-mid | ie | ie^1 | | | | | | | |
| front -r/close-mid/short | ie_s_ | [10] | ie^2 | | | | | | |
| front -r/close-mid/breathy | ie_c_ | ie_o_^1 | [10] | ie^3 | | | | | |
| front -r/close-mid/-v | ie_o_ | [10] | | [9] | ie^4 | | | | |
| front -r/close-mid/retr | ie_r_ | | | | [9] | | | ii^8 | |
| front -r/close-mid/pharyn | ie_x_ | | | ie_h_^1 | | | | [2] | |
| front -r/close-mid/laryn | ie_h_ | | | [9] | ie^5 | | | | |
| front -r/close-mid/nasal/laryn | ie_~h_ | | | ie_~h_^1 | [5] | | | | |
| front -r/close-mid/nasal/long | ie_~:_ | | | [7] | ie_~_^1 | | | | |
| front -r/close-mid/nasal | ie_~_ | | | | [8] | | | | |
| front -r/close-mid/long | ie_:_ | | | | ie_j_^3 | ie^6 | | | ii^9 |
| front -r/close-mid/palatal offglide | ie_j_ | | | ie_j_^2 | [6] | [5] | | | [1] |
| front -r/close-mid/labial offglide | ie_w_ | | ie_w_^1 | ie_j_^1 | [6] | | | | |
| front -r/close-mid/central offglide | ie_e_ | | [8] | [6] | | | | | |
| | | | | | | | | | |
| front +r/close-mid | ye | | | | ye^1 | | | | |
| front +r/close-mid/short | ye_s_ | | | | [10] | | | | |
| front +r/close-mid/nasal | ye_~_ | | | | | ye^2 | | | |
| front +r/close-mid/long | ye_:_ | | | | ye_j_^ | [5] | | | |
| front +r/close-mid/palatal offglide | ye_j_ | | | ye_j_^2 | [6] | | | | |
| front +r/close-mid/labial offglide | ye_w_ | | ye_e_^1 | ye_j_^1 | [7] | | | lo^5 | |
| front +r/close-mid/central offglide | ye_e_ | | [8] | [8] | | | | [2] | |
| | | | | | | | | | |
| front -r/open-mid | io | | | io^1 | | | | | |
| front -r/open-mid/short | io_s_ | | | [10] | io^2 | | | | |
| front -r/open-mid/laryn | io_h_ | | | | [9] | | | | |
| front -r/open-mid/nasal/long | io_~:_ | | | io_~_^1 | | io^3 | | | |
| front -r/open-mid/nasal | io_~_ | | | [7] | | [5] | | | |
| front -r/open-mid/long | io_:_ | | | | io_:_^2 | | | | |
| front -r/open-mid/palatal offglide | io_j_ | | | io_:_^1 | [6] | | lo^4 | | |
| front -r/open-mid/labial offglide | io_w_ | | io_w_^1 | io_w_^2 | [6] | | [5] | | |

| Category | | | | | | | | |
|---|---|---|---|---|---|---|---|---|
| front -r/open-mid/central offglide | io_e_ | | [7] | [7] | | | | |
| front +r/open-mid | yo | | | | | yo^1 [6] | | |
| front +r/open-mid/long | yo_:_ | | | | | | | |
| front +r/open-mid/nasal | yo_~_ | | | | | yo^2 | | |
| front +r/open-mid/palatal offglide | yo_j_ | | | | | yo_j_^1 [5] | | |
| front +r/open-mid/labial offglide | yo_w_ | | | yo_w_^1 [8] | yo_j_^1 [8] | [7] | | |
| front +r/open-mid/central offglide | yo_e_ | | | | | | | |
| | | | | | | | | ea^11 [1] |
| central -r/open | ea | ea^1 [10] | | | | | | |
| central -r/open/short | ea_s_ | | ea^2 [10] | ea^3 [9] | | | | |
| central -r/open/breathy | ea_c_ | ea_o_^1 [10] | | | | | | |
| central -r/open/-v | ea_o_ | | | | ea^4 [8] | | | |
| central -r/open/retr | ea_r_ | | | | | | | |
| central -r/open/pharyn | ea_x_ | | | ea_h_^1 [9] | | | | |
| central -r/open/laryn | ea_h_ | | | | | | | |
| central -r/open/nasal/pharyn | ea_~x_^1 | ea_~x_^1 [8] | | | ea^5 [3] | | | |
| central -r/open/nasal/long/pharyn | ea_~:x_ | | ea_~h_^1 [9] | ea_~_^2 [8] | | | | |
| central -r/open/nasal/laryn | ea_~h_ | | | | | | | |
| central -r/open/nasal/long | ea_~:_ | | ea_~_^1 [7] | | | ea^6 [7] | ea^7 [3] | |
| central -r/open/nasal | ea_~_ | | | | ea_j_^3 [4] | | | |
| central -r/open/long/pharyn | ea_:x_ | ea_:_^1 [7] | | | | | | |
| central -r/open/long | ea_:_ | | ea_j_^1 [5] | | | | | |
| central -r/open/palatal offglide | ea_j_^0 | | | ea_j_^2 [8] | | | | |
| central -r/open/labial offglide | ea_w_ | | ea_w_^1 [3] | | | | | |
| central -r/open/central offglide | ea_e_ | | [8] | | | | | |
| central ++r/open | oa | | | | | | | |
| back +r/open | ua | | | | ua^1 [10] | | | |
| back +r/open/short | ua_s_ | | | | | | | |
| back +r/open/nasal | ua_~_ | | | | ua^2 [7] | | | |
| back +r/open/long | ua_:_ | | | | | | | |
| back +r/open/palatal offglide | ua_j_ | | | ua_w_^3 [8] | ua_w_^4 [7] | | | |
| back +r/open/labial offglide | ua_w_ | ua_w_^1 [8] | ua_w_^2 [8] | | | | | |
| back +r/open/central offglide | ua_e_ | | | | | | | |
| | | | | | | aa^2 [5] | | |
| back -r/open | aa | | | | | | | |
| back -r/open/nasal/long | aa_~:_ | | aa_~_^1 [6] | | | | | |
| back -r/open/nasal | aa_~_ | | | | aa^1 | | | |
| back -r/open/long | aa_:_ | | | aa_w_^4 [5] | | | | |

| Label | | | | | | | | | | |
|---|---|---|---|---|---|---|---|---|---|---|
| back -r/open/palatal offglide | aa_j_ | | | | aa_w_^3 [5] | | | | ea^8 [4] | |
| back -r/open/labial offglide | aa_w_ | | aa_w_^1 [8] | aa_w_^2 [7] | | | | | | |
| back -r/open/central offglide | aa_e_ | | | | | | | | | |
| | | | | | | | | | | |
| central -r/open2-mid | ec | | | | | ec^1 [10] | | | | |
| central -r/open2-mid/short | ec_s_ | | | | | | ec^2 [8] | | | |
| central -r/open2-mid/pharyn | ec_x_ | | | | | | | ec^3 [7] | | |
| central -r/open2-mid/palatal offglide | ec_j_ | | | | | | | | | |
| central -r/open2-mid/labial offglide | ec_w_ | | | | | ec_w_^1 [9] | ec_w_^2 [7] | | | |
| central -r/open2-mid/central offglide | ec_e_ | | | | | | | | | |
| | | | | | | | | | | |
| front -r/open2-mid | ic | | | | | ic^1 [8] | | ic^3 [4] | | |
| front -r/open2-mid/pharyn | ic_x_ | | | | | | | | | |
| front -r/open2-mid/nasal/long | ic_~:_ | | | | | ic_~_^1 [7] | ic^2 [5] | | | |
| front -r/open2-mid/nasal | ic_~_ | | | | | | | | | |
| front -r/open2-mid/long | ic_:_ | | | | | | ic_w_^4 [6] | | | |
| front -r/open2-mid/palatal offglide | ic_j_ | | | | | ic_w_^3 [7] | | | | |
| front -r/open2-mid/labial offglide | ic_w_ | | ic_w_^1 [9] | ic_w_^2 [8] | | | | | | |
| front -r/open2-mid/central offglide | ic_e_ | | | | | | | | ea^9 [3] | ea^10 [1] |
| | | | | | | | | | | |
| central -r/mid | ex | | | | | ex^1 [10] | ex^2 [9] | | | |
| central -r/mid/short | ex_s_ | | | | | | | | | |
| central -r/mid/nasal/long | ex_~:_ | | | | | ex_~_^1 [7] | ex^3 [7] | | | |
| central -r/mid/nasal | ex_~_ | | | | | | | | | |
| central -r/mid/long | ex_:_ | | er^1 [8] | | | er^5 [5] | | | | |
| central -r/mid/retr | er | | | er^2 [7] | er^3 [7] | er^4 [7] | | | | |
| central -r/mid/palatal offglide | ex_j_ | | | | | | | | | |
| central -r/mid/labial offglide | ex_w_ | | | | | | | ex^4 [7] | | |
| central -r/mid/central offglide | ex_e_ | | | | | | | | | |
| | | | | | | | | | | |
| central +r/mid | ox | | | | | ox^1 [10] | | | ex^5 [7] | |
| central +r/mid/short | ox_s_ | | | | | | ox^2 [7] | | | |
| central +r/mid/long | ox_:_ | | | | | | | | | |
| central +r/mid/palatal offglide | ox_j_ | | | | | ox_w_^1 [8] | | | | |
| central +r/mid/labial offglide | ox_w_ | | | ox_w_^1 [9] | ox_w_^2 [8] | | | | | |
| central +r/mid/central offglide | ox_e_ | | | | | | | | | |
| | | | | | | | | | | |
| central -r/open-mid | eo | | | | | | | | | |
| central -r/open-mid/nasal | eo_~_ | | | | | | | | | |
| central -r/open-mid/palatal offglide | eo_j_ | | | | | eo_w_ [8] | eo^1 [8] | | | |
| central -r/open-mid/labial offglide | eo_w_ | | | eo_w_^1 | eo_w_^2 [8] | | | | | |

| Category | | | | | | | | | |
|---|---|---|---|---|---|---|---|---|---|
| central -r/open-mid/central offglide | eo_e_ | | | [9] | [8] | | | eo^2 [7] | |
| central +r/open-mid | oo | | | | | | | | |
| central +r/open-mid/palatal offglide | oo_j_ | | | | | | | oo^1 | |
| central +r/open-mid/labial offglide | oo_w_ | | | | | oo_w_^1 | oo_w_ [9] | | |
| central +r/open-mid/central offglide | oo_e_ | | | | | [10] | [9] | | |
| bilabial/approx +v | pw | | | | | | | pw^1 | |
| bilabial/approx +v/long | pw_:_ | | | | | | | [8] | |
| | | | | | | | | pw^2 [7] | |
| labio-dental/approx +v | fw | | | | | | | | |
| | | | | | | | | fw^1 [7] | |
| labio-palatal/approx +v | mw | | | | | | | | |
| | | | | | | | | | bw^3 [6] |
| labio-velar/approx +v | bw | | | | | | | | |
| labio-velar/approx +v/laryn | bw_h_ | | | | | | | | |
| labio-velar/approx -v | bw_o_ | | | | | | | | |
| labio-velar/approx +v/long | bw_:_ | | | | | bw_o_^1 [6] | bw_h_ [6] | bw^1 [6] | bw^2 [5] |
| labio-velar/approx +v/nasal | bw_~_ | | | | bw_:_^1 [8] | | | | |
| | | | | bw_~_^1 [7] | | | | | |
| velar/approx +v/nasal | kw_~_ | | | | | | | | |
| velar/approx +v | kw | | | | | | | | |
| back +r/close | ui | | | ui^1 [9] | | | | | |
| back +r/close/-v | ui_o_ | | | | ui^2 [9] | | | | |
| back +r/close/short | ui_s_ | | | ui_s_^1 [9] | | ui^3 [9] | | | |
| back +r/close/breathy | ui_c_ | | | [9] | | | | | |
| back +r/close/pharyn | ui_x_ | | | ui_h_^1 [9] | | | | | |
| back +r/close/laryn | ui_h_ | | | | | | | | |
| back +r/close/nasal/long | ui_~:_ | | | ui_~_^1 [7] | | ui^4 [5] | | | |
| back +r/close/nasal | ui_~_ | | | | | | | | |
| back +r/close/long/pharyn | ui_:x_ | | | ui_:_^1 [8] | | ui_:_^3 [6] | | | |
| back +r/close/long | ui_:_ | | | | | | | ui^5 [7] | |
| back +r/close/palatal offglide | ui_j_ | | | | ul_:_^2 [4] | | | | |
| back +r/close/labial offglide | ui_w_ | ui_w_^1 | ui_w_^2 [6] | | | | | | |
| back +r/close/central offglide | ui_e_ | [6] | [6] | | | | ui^6 [4] | | |
| central +r/close | oi | | | oi^1 [10] | | | | | |
| central +r/close/short | oi_s_ | | | | oi^2 [8] | | | | |
| central +r/close/long | oi_:_ | | | | | oi^3 [7] | | ui^7 [4] | |

| Category | | | | | | | | | |
|---|---|---|---|---|---|---|---|---|---|
| central +r/close-mid | oe | | | | | | | | |
| | | | | | | | | | |
| back -r/close | ai | | | | ai^1 [10] | | | | |
| back -r/close/short | ai_s_ | | | | | | | | |
| back -r/close/nasal | ai_~_ | | | | | ai^2 [6] | | | |
| back -r/close/long | ai_:_ | | | | | | | | |
| back -r/close/palatal offglide | ai_j_ | | | ai_w_^3 [8] | ai_w_^4 [7] | | | | |
| back -r/close/labial offglide | ai_w_ | ai_w_^1 [9] | ai_w_^2 [9] | | | | | | |
| back -r/close/central offglide | ai_e_ | | | | | | | | |
| | | | | | | | | | |
| back +r/close-lax | uh | | | | uh_x_^1 [8] | uh^1 [8] | | | |
| back +r/close-lax/pharyn | uh_x_ | | | | | | uh^2 [5] | | |
| back +r/close-lax/long/pharyn | uh_:x_ | | | | | | | | |
| back +r/close-lax/nasal | uh_~_ | | | | | | | | |
| back +r/close-lax/long | uh_:_ | | | | | | | | |
| back +r/close-lax/palatal offglide | uh_j_ | | | uh_w_^3 [7] | uh_w_^4 [6] | | | | |
| back +r/close-lax/labial offglide | uh_w_ | uh_w_^1 [8] | uh_w_^2 [7] | | | | | | |
| back +r/close-lax/central offglide | uh_e_ | | | | | | | | |
| | | | | | | | | | |
| back +r/close-mid | ue | | | ue^1 [10] | | | | ui^8 [2] | ui^9 [1] |
| back +r/close-mid/short | ue_s_ | | | | ue^2 [10] | ue^3 [8] | | | |
| back +r/close-mid/breathy | ue_c_ | | | ue_o_^1 [10] | | | | | |
| back +r/close-mid/-v | ue_o_ | | | | | | | | |
| back +r/close-mid/pharyn | ue_x_ | | | ue_h_^1 [9] | | | | | |
| back +r/close-mid/laryn | ue_h_ | | | | | | | | |
| back +r/close-mid/nasal/laryn | ue_~h_ | | | ue_~:_^1 [7] | | ue^4 [6] | | | |
| back +r/close-mid/nasal/long | ue_~:_ | | | | ue_~_^1 [8] | | ue^5 [6] | | |
| back +r/close-mid/nasal | ue_~_ | | | ue_:_^1 [8] | | | | | |
| back +r/close-mid/long/pharyn | ue_:x_ | | | | ue_:_^3 [5] | | | | |
| back +r/close-mid/long | ue_:_ | | | | ue_:_^2 | | | | |
| back +r/close-mid/palatal offglide | ue_j_ | | | | | | | | |
| back +r/close-mid/labial offglide | ue_w_ | ue_w_^1 [6] | ue_w_^2 [6] | | | | | | |
| back +r/close-mid/central offglide | ue_e_ | | | | | | | | |
| | | | | | | | | | |
| back -r/close-mid | ae | | | | ae^1 [7] | ae^2 [7] | | | |
| back -r/close-mid/long | ae_:_ | | | | | | ae^3 [6] | ue^6 [2] | |
| back -r/close-mid/nasal | ae_~_ | | | | | | | | |
| back -r/close-mid/palatal offglide | ae_j_ | | | | | | | | |
| back -r/close-mid/labial offglide | ae_w_ | | | | ae_w_^1 [8] | ae_w_^2 [7] | | | |
| back -r/close-mid/central offglide | ae_e_ | | | | | | | | |

| | | | | | | | |
|---|---|---|---|---|---|---|---|
| back +r/open-mid | uo | | | uo^1 [10] | uo^2 [9] | | |
| back +r/open-mid/short | uo_s_ | | | | | | |
| back +r/open-mid/pharyn | uo_x_ | | | uo_h_ [9] | | | |
| back +r/open-mid/laryn | uo_h_ | | | | | | |
| back +r/open-mid/nasal/long/pharyn | uo_~:x_ | | uo_~:_^1 [6] | | uo^3 [5] | | |
| back +r/open-mid/nasal/long | uo_~:_ | | | uo_~_^1 [6] | | | |
| back +r/open-mid/nasal | uo_~_ | | | | | | uo^4 [6] |
| back +r/open-mid/long | uo_:_ | | | | uo_j_^3 [5] | | |
| back +r/open-mid/palatal offglide | uo_j_ | | | uo_j_^2 [5] | | | |
| back +r/open-mid/labial offglide | uo_w_ | uo_w_^1 [8] | uo_j_^1 [8] | | | | |
| back +r/open-mid/central offglide | uo_e_ | | | | | | |
| | | | | | | | |
| back -r/open-mid | ao | | | | | | |
| back -r/open-mid/nasal | ao_~_ | | | | | | |
| back -r/open-mid/palatal offglide | ao_j_ | | | | ao_w_^3 [8] | ao^1 [8] | |
| back -r/open-mid/labial offglide | ao_w_ | | ao_w_^1 [9] | ao_w_^2 [8] | | | |
| back -r/open-mid/central offglide | ao_e_ | | | | | | |

We claim:

1. A method to provide a polyphone network, comprising:
   selecting a plurality of spoken languages;
   identifying at least some phones for each of the plurality of spoken languages;
   providing a polyphone network that is a hierarchical phone correspondence network comprising the at least some phones, and that includes a low resolution level of phone information, wherein the phone information of the low resolution level is determined from corresponding higher resolution phone information levels as a function of at least:
      articulatorily defined phonetic similarity as between the higher resolution phone information level phones; and
      at least one language-independent phonological factor.

2. The method of claim 1, wherein selecting a plurality of spoken languages comprises selecting a plurality of spoken languages that includes at least two languages that are substantially typologically diverse with respect to one another.

3. The method of claim 2, wherein selecting a plurality of spoken languages that includes at least two languages that are substantially typologically diverse with respect to one another includes selecting at least five percent of all currently spoken languages.

4. The method of claim 3 wherein selecting at least five percent of all currently spoken languages includes selecting at least twenty-five percent of all currently spoken languages.

5. The method of claim 1 wherein identifying at least some phones for each of the plurality of spoken languages includes identifying at least some phonemes that are substantially unique to each of at least some of the plurality of spoken languages.

6. The method of claim 5 wherein identifying at least some phonemes that are substantially unique to each of at least some of the plurality of spoken languages includes identifying substantially all unique phonemes for substantially all of the plurality of spoken languages.

7. The method of claim 1 wherein providing a hierarchical phone correspondence network includes organizing merged phone selections in at least one tree.

8. The method of claim 1 wherein providing a hierarchical phone correspondence network includes organizing merged phone selections in at least one binary branching tree.

9. The method of claim 1 wherein providing a polyphone network includes providing a higher resolution view of phone information.

10. The method of claim 9 wherein providing a higher resolution view of phone information includes providing a higher resolution view of phone information wherein at least some of the phone information comprises phonemes for at least some of the plurality of spoken languages.

11. The method of claim 9 wherein providing a polyphone network further includes providing a high resolution view of phone information that is a less high resolution view than the higher resolution view of phone information.

12. The method of claim 9 wherein providing a polyphone network further includes providing a lower resolution view of phone information comprised of phone categories.

13. The method of claim 9 wherein providing a high resolution view of phone information includes providing a binary branching tree hierarchy.

14. The method of claim 13 wherein providing a hierarchical phone correspondence network comprising at least one binary branching tree includes providing a hierarchical phone correspondence network comprising at least one binary branching tree having at least one level of non-merged phones and at least five potential levels of hierarchically merged phone nodes.

15. The method of claim 14 wherein providing a hierarchical phone correspondence network comprising at least one binary branching tree having at least one level of non-merged phones and at least five potential levels of hierarchically merged phone nodes includes providing at least some merged phone nodes that each comprise a merger of a plurality of phone categories, which phone categories are themselves each most representative of a given plurality of phone categories.

16. The apparatus of claim 15 wherein the polyphone network is represented by standard, printable ASCII characters, none of which comprises a special character commonly having a corresponding computer operation command meaning nor to which Unix command line interpreters prescribe special significance, such that the polyphone network only requires a standard font set and substantially avoids programming collisions.

17. The method of claim 1 wherein the at least one language-independent phonological factor comprises at least one of language-independent phonological contrast, cross-linguistic phone frequency, predetermined linguistic tendencies, and predetermined linguistic universals.

18. The method of claim 1 wherein providing a polyphone network includes providing a polyphone network that is substantially unbiased towards any particular language.

19. The method of claim 18 wherein providing a polyphone network includes providing a polyphone network that is substantially unbiased towards any particular language family.

20. The method of claim 19 wherein providing a polyphone network includes providing a polyphone network that is substantially unbiased towards any particular language type.

21. The method of claim 1 wherein identifying at least some phones for each of the plurality of spoken languages includes representing the phones using a transcription system that comprises only standard, printable ASCII characters, none of which comprise a special character commonly having a corresponding computer operation command meaning nor to which Unix command line interpreters prescribe special significance, such that the transcription system characters only require a standard font set and substantially avoid programming collisions.

22. The method of claim 1 where identifying at least some phones includes representing the phones using a transcription system that comprises only standard, printable ASCII characters, none of which comprise a special character commonly having a corresponding computer operation command meaning nor to which Unix command line interpreters prescribe special significance, such that the transcription system characters only require a standard font set and substantially avoid programming collisions.

23. An apparatus comprising:
    a speech recognition engine;
    a memory operable coupled to the speech recognition engine and containing a set of models selected as a function, at least in part, of a polyphone network that is a hierarchical phone correspondence network comprised of a plurality of phones, which phones correspond to phones as used in a plurality of spoken languages and wherein relationships between the phones at lower resolution levels are represented hierarchically by nodes that correspond to merged phones from higher resolution levels, wherein merging of the phones to form the nodes is based, at least in part, upon articulatory phonetic similarity as between the phones and at least one language-independent phonological factor.

24. The apparatus of claim 23 wherein the apparatus comprises a wireless communications device.

25. The apparatus of claim 23 wherein the wireless communications device comprises a two-way wireless communications device.

* * * * *